US011034820B2

(12) United States Patent
An et al.

(10) Patent No.: US 11,034,820 B2
(45) Date of Patent: Jun. 15, 2021

(54) CELLULOSE ESTER AND ETHYLENE VINYL ACETATE COMPOSITIONS AND ARTICLES MADE USING THESE COMPOSITIONS

(71) Applicant: Eastman Chemical Company, Kingsport, TN (US)

(72) Inventors: Haining An, Kingsport, TN (US); Michael Eugene Donelson, Kingsport, TN (US); Wenlai Feng, Johnson City, TN (US); Thomas Joseph Pecorini, Kingsport, TN (US); Michael John Rodig, Johnson City, TN (US); Marcus David Shelby, Fall Branch, TN (US)

(73) Assignee: Eastman Chemical Company, Kingsport, TN (US)

(*) Notice: Subject to any disclaimer, the term of this patent is extended or adjusted under 35 U.S.C. 154(b) by 68 days.

(21) Appl. No.: 16/348,560

(22) PCT Filed: Nov. 9, 2017

(86) PCT No.: PCT/US2017/060767
§ 371 (c)(1),
(2) Date: May 9, 2019

(87) PCT Pub. No.: WO2018/089575
PCT Pub. Date: May 17, 2018

(65) Prior Publication Data
US 2019/0359794 A1    Nov. 28, 2019

Related U.S. Application Data

(60) Provisional application No. 62/420,989, filed on Nov. 11, 2016, provisional application No. 62/505,261, filed on May 12, 2017, provisional application No. 62/513,467, filed on Jun. 1, 2017, provisional application No. 62/563,671, filed on Sep. 27, 2017.

(51) Int. Cl.
*C08L 1/14* (2006.01)
*C08K 5/00* (2006.01)
*C08L 23/08* (2006.01)

(52) U.S. Cl.
CPC .............. *C08L 1/14* (2013.01); *C08K 5/0016* (2013.01); *C08L 23/0853* (2013.01)

(58) Field of Classification Search
None
See application file for complete search history.

(56) References Cited

U.S. PATENT DOCUMENTS

| | | |
|---|---|---|
| 1,683,347 A | 9/1928 | Gray et al. |
| 1,698,049 A | 1/1929 | Clarke et al. |
| 1,880,560 A | 10/1932 | Webber et al. |
| 1,880,808 A | 10/1932 | Clarke et al. |
| 1,984,147 A | 12/1934 | Malm |
| 2,129,052 A | 9/1938 | Fordyce |
| 3,448,173 A | 6/1969 | Ryan et al. |
| 3,617,201 A | 11/1971 | Bernie et al. |
| 3,655,825 A | 4/1972 | Souder et al. |
| 3,682,850 A | 8/1972 | Coates |
| 3,853,968 A | 12/1974 | Bortnick et al. |
| 4,097,429 A | 6/1978 | Eighani et al. |
| 4,147,603 A | 4/1979 | Pacifici et al. |
| 4,193,897 A * | 3/1980 | Wingler ............... C08L 1/10 351/159.33 |
| 4,263,183 A | 4/1981 | Light et al. |
| 4,360,635 A * | 11/1982 | Alberts ............... C08F 255/026 525/54.21 |
| 4,427,809 A * | 1/1984 | Alberts ............... C08F 251/02 524/37 |
| 4,446,585 A | 5/1984 | Harding et al. |
| 4,758,645 A | 7/1988 | Miyazono et al. |
| 4,839,230 A | 6/1989 | Cook |
| 4,861,629 A | 8/1989 | Nahm |
| 5,082,914 A | 1/1992 | Cook et al. |
| 5,182,379 A | 1/1993 | Cook et al. |
| 5,292,877 A | 3/1994 | Edgar et al. |
| 5,384,163 A | 1/1995 | Budde et al. |
| 5,534,594 A | 7/1996 | Troy et al. |
| 5,723,151 A | 3/1998 | Cook et al. |
| 5,741,901 A | 4/1998 | Cook et al. |
| 5,750,677 A | 5/1998 | Edgar et al. |
| 5,871,573 A | 2/1999 | Cook et al. |
| 5,981,738 A | 11/1999 | Cook et al. |
| 6,331,580 B1 | 12/2001 | Molnar |
| 6,369,214 B1 | 4/2002 | Tye et al. |
| 9,151,870 B2 * | 10/2015 | Kiuchi ............... C08L 1/14 |

(Continued)

FOREIGN PATENT DOCUMENTS

EP    0 013 366 A1    7/1980

OTHER PUBLICATIONS

ASTM D3418; "Standard Test Method for Transition Temperatures and Enthalpies of Fusion and Crystallization of Polymers by Differential Scanning Calorimetry"; Jun. 2015.
ASTM D790; "Standard Test Methods for Flexural Properties of Unreinforced and Reinforced Plastics and Electrical Insulating Materials"; Jul. 2017.
ASTM D1003; "Standard Test Method for Haze and Luminous Transmittance of Transparent Plastics"; Nov. 2013.
ASTMD4603; "Standard Test Method for Determining Inherent Viscosity of Poly(Ethylene Terephthalate) (PET) by Glass Capillary Viscometer"; Jun. 2018.

(Continued)

*Primary Examiner* — Peter A Salamon
(74) *Attorney, Agent, or Firm* — Robert C. Morriss

(57) ABSTRACT

A cellulose ester composition is provided comprising at least one cellulose ester and at least one ethylene vinyl acetate copolymer and optionally at least one plasticizer. Processes for producing the cellulose ester compositions as well as articles made using these compositions, such as eyeglass frames, automotive parts, and toys are also provided.

20 Claims, No Drawings

(56) References Cited

U.S. PATENT DOCUMENTS

| | | | | |
|---|---|---|---|---|
| 2006/0058425 | A1* | 3/2006 | Mohanty | C08L 1/10 523/209 |
| 2011/0319529 | A1 | 12/2011 | Helmer et al. | |
| 2013/0222741 | A1* | 8/2013 | Kiuchi | C08L 1/10 349/96 |
| 2017/0261133 | A1* | 9/2017 | Nakamura | B32B 27/308 |
| 2019/0359794 | A1* | 11/2019 | An | C08L 1/14 |

OTHER PUBLICATIONS

ASTM D256; "Standard Test Methods for Determining the Izod Pendulum Impact Resistance of Plastics"; Nov. 2018.
ASTM D4440; "Standard Test Method for Plastics: Dynamic Mechanical Melt Rheology"; Feb. 2015.
Shelton, Michael C.; "Cellulose Esters, Inorganic Esters"; Kirk-Othmer Encyclopedia of Chemical Technology, $5^{th}$ edition, vol. 5 (2004), pp. 394-412.
Gedon, Steven, et al.; "Cellulose Esters, Organic Esters"; Kirk-Othmer Encyclopedia of Chemical Technology, $5^{th}$ edition, vol. 5 (2004), pp. 412-444.
Notification of Transmittal of The International Search Report and The Written Opinion of the International Searching Authority, or the Declaration; International Application No. PCT/US2017/060767 with an International Filing Date of Nov. 9, 2017.

* cited by examiner

CELLULOSE ESTER AND ETHYLENE VINYL ACETATE COMPOSITIONS AND ARTICLES MADE USING THESE COMPOSITIONS

CROSS-REFERENCE TO RELATED APPLICATION(S)

This application is a national stage filing under 35 USC § 371 of International Application Number PCT/US2017/060767, filed on Nov. 9, 2017, which claims the benefit of the filing date to U.S. Provisional Application Ser. Nos. 62/420,989 filed on Nov. 11, 2016, 62/505,261 filed on May 12, 2017, 62/513,467 filed on Jun. 1, 2017 and 62/563,671 filed on Sep. 27, 2017, the entire disclosures of which are incorporated by reference herein.

FIELD OF THE INVENTION

This invention belongs to the field of cellulose ester chemistry, particularly to cellulose esters comprising ethylene vinyl acetate (EVA) copolymers and optionally, plasticizers. The invention also belongs to a field of cellulose ester compositions comprising at least one EVA copolymer and optionally at least one plasticizer. Processes for producing these cellulose ester compositions as well as plastic articles made using these compositions, such as eyeglass frames, automotive parts, and toys are also provided.

BACKGROUND OF THE INVENTION

Cellulose ester compositions typically have a heat deflection temperature (HDT) or glass transition temperature (Tg) of less than 90° C. Commercially available cellulose esters that are melt processed into articles typically contain significant amounts of plasticizer to allow for processing and to impart sufficient toughness to the molded article. However, the addition of plasticizer has drawbacks, as it will decrease the HDT relative to the base cellulose ester and limit the use of the cellulose ester materials for applications that can accommodate an HDT below about 90° C. Also, cellulose ester molded articles can experience plasticizer exudation during use.

Combining certain EVA copolymers with certain cellulose esters have been suggested to eliminate the need for low molecular weight plasticizers. However, the previously suggested combinations were limited to certain relatively lower molecular weight cellulose esters to provide acceptable processing and melt flow for molding applications. As a result, the use of such materials has limited use for higher temperature end use and higher impact toughness applications.

It would be beneficial to be able to provide melt processable cellulose ester compositions that do not have such drawbacks.

BRIEF SUMMARY OF THE INVENTION

Surprisingly, it has been discovered that compositions of cellulose esters, including cellulose acetate propionate and cellulose acetate butyrate, can be prepared with glass transition temperatures (Tg's) exceeding 120° C. and have good clarity and toughness. In embodiments of this invention, this can be achieved by reducing the amount of plasticizer and in certain embodiments completely eliminating the use of plasticizers in the compositions. The elimination of the plasticizer can eliminate the common problems associated with plasticizer exudation during use. However, reducing or eliminating the plasticizer can decrease the toughness of these high Tg cellulosic compositions. Surprisingly, it has been found that certain EVA copolymers can restore the toughness of high Tg cellulosic compositions, and provide a cellulose ester composition with good flow properties and good clarity that is suitable for higher temperature applications and that maintains long term dimensional stability.

In certain embodiments, this invention relates to the dispersion of EVA copolymer into cellulose ester compositions, in amounts sufficient to improve the mechanical and physical properties of the cellulose ester compositions. The EVA copolymer modified cellulose esters, according to embodiments of the invention, have the unique properties of being melt processable, having significantly higher Tg's relative to commercially available plasticized cellulose ester thermoplastics, have high modulus, good impact properties and good resistance to deformation under load.

In one embodiment of the invention, a cellulose ester composition is provided comprising at least one cellulose ester, at least one ethylene vinyl acetate (EVA) copolymer, and optionally at least one plasticizer. In one embodiment, the relative viscosity of the cellulose ester is greater than 6.0, for an acetone solution containing 2 wt % of the cellulose ester, measured at 25° C., and the cellulose ester composition has a Tg of at least 120° C.

In another embodiment of the invention, a cellulose ester composition is provided which comprises at least one cellulose ester, and at least one EVA copolymer, and at least one plasticizer.

In another embodiment of the invention, a process for producing the cellulose ester composition is provided comprising contacting at least one cellulose ester, at least one EVA copolymer, and optionally, at least one plasticizer, and mixing the combination. In one embodiment, the plasticizer is present in an amount that does not substantially reduce the Tg of the cellulose ester composition compared to a similar composition without the plasticizer. In embodiments, the Tg does not change (e.g., reduce) more than 10%, or 5%, or 2%, as a result of including the plasticizer.

In embodiments of the invention, cellulose ester compositions are described that contain no plasticizer, but contain 1 wt %-35 wt %, or 2.5 wt %-30 wt %, or 10 to 30 wt % EVA copolymer, based on the total weight of the cellulose ester composition, and have Tg values greater than 120° C., and have notched Izod impact strength values greater than 100, or 125, or 150 J/m.

In another embodiment of the invention, cellulose ester compositions are provided that contain no plasticizer, but are melt processable. In embodiments, the melt processable cellulose ester compositions contain 1 wt %-35 wt %, or 2.5 wt %-30 wt %, or 10 to 30 wt % EVA copolymer, based on the total weight of the cellulose ester composition, and have Tg values greater than 120° C., notched Izod impact strength values greater than 100, or 125, or 150 J/m, and spiral flow values of at least 38 centimeters (15 inches) when measured when measured using the procedure described herein at a barrel temperate of 240° C.

In another embodiment of the invention, the melt processable cellulose ester compositions contain 2 wt %-20 wt %, or 5 wt %-15 wt % EVA copolymer, based on the total weight of the cellulose ester composition, and have Tg values greater than 120° C., notched Izod impact strength values greater than 100, or 125, or 150 J/m, and viscosities at 230° C. and 100 rad/sec less than 10,000 P.

In other embodiments, the melt processable cellulose ester compositions described above, can contain some plasticizer. In embodiments, the plasticizer is present in an amount that does not substantially reduce the Tg of the cellulose ester composition compared to a similar composition without the plasticizer. In embodiments, the Tg does not change (e.g., reduce) more than 10%, or 5%, or 2%, as a result of including the plasticizer.

In one embodiment of the invention, melt processable cellulose ester compositions are described that contain up to 15 wt % plasticizer, or up to 10 wt % plasticizer; contain 1 wt %-35 wt %, or 2.5 wt %-30 wt %, or 10 to 30 wt % EVA copolymer; have Tg values greater than 120° C.; and have notched Izod impact strength values greater than 100, or 125, or 150 J/m.

In another embodiment of the invention, melt processable cellulose ester compositions are described that contain up to 15 wt % plasticizer, or up to 10 wt % plasticizer, based on the total weight of the cellulose ester composition; contain 1 wt %-35 wt %, or 2.5 wt %-30 wt %, or 10 to 30 wt % EVA copolymer, based on the total weight of the cellulose ester composition; have Tg values greater than 120° C.; have notched Izod impact strength values greater than 100 J/m; and have spiral flow values of at least 38 centimeters (15 inches) when measured using the procedure described herein at a barrel temperature of 240° C.

In another embodiment of the invention, melt processable cellulose ester compositions are described that contain up to 15 wt % plasticizer, or up to 10 wt % plasticizer, based on the total weight of the cellulose ester composition; contain 1 wt %-35 wt %, or 2.5 wt %-30 wt %, or 10 to 30 wt % EVA copolymer, based on the total weight of the cellulose ester composition; have Tg values greater than 120° C.; have notched Izod impact strength values greater than 100 J/m; and have viscosities at 230° C. and 100 rad/sec less than 10,000 P.

In one embodiment of the invention, a polymer-based resin is provided comprising at least one cellulose ester, at least one EVA copolymer, and optionally, at least one plasticizer, where the cellulose ester is CAP and where the resin contains 0-5 wt %, 0-2 wt %, or 0-1 wt % plasticizer. In one embodiment, the cellulose ester is CAP and the resin contains no plasticizer. In one embodiment, the cellulose ester is CAP, the EVA is not modified, and the resin contains no plasticizer and less than 5 wt %, or less than 2 wt % of any other additives.

In another embodiment of the invention, a cellulose ester composition is provided comprising at least one cellulose ester, and at least one EVA copolymer and optionally at least one plasticizer, where the cellulose ester is CAB and contains 0-5 wt %, 0-2 wt %, or 0-1 wt % plasticizer. In one embodiment, the cellulose ester is CAB and the resin contains no plasticizer. In one embodiment, the cellulose ester is CAB, the EVA is not modified, and the resin contains no plasticizer and less than 5 wt %, or less than 2 wt % of any other additives.

In certain embodiments, the cellulose ester resin is chosen from at least one cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tri-propionate (CTP), or cellulose tributyrate (CTB). In certain embodiments, the resin contains less than 25, or less than 20, or less than 15, or less than 10, or less than 5 wt %, or none, of any other polymer(s) that contribute to the continuous binder phase of the resin with the cellulose ester. For example, EVA is present as a dispersed phase within the cellulose ester resin and does not contribute to the continuous binder phase of the resin with the cellulose ester.

In certain embodiments, the cellulose ester resin is chosen from at least one cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tri-propionate (CTP), or cellulose tributyrate (CTB), and having a relative viscosity higher than 6.0. In certain embodiments, the cellulose ester resin can be an individual grade with a relative viscosity higher than 6.0, or a blend of cellulose esters with one or more grades having a lower relative viscosity (i.e., <6.0) and at least one grade having a higher relative viscosity (i.e., >6.0). In one embodiment, the cellulose ester resin can be a blend of cellulose esters with one or more grades having a lower relative viscosity (i.e., <6.0) and at least one grade having a higher relative viscosity (i.e., >6.0), where the blend results in an average relative viscosity higher than 6.0. The relative viscosity is determined for a 2% cellulose ester solution in acetone, measured at a temperature of 25° C.

In certain embodiments, the cellulose ester having a relative viscosity larger than 6.0 can be chosen from cellulose acetate butyrate containing from about 15 to about 57% by weight butyryl, based on the total weight of the polymer. In certain embodiments, the cellulose ester having a relative viscosity larger than 6.0 can be chosen from cellulose acetate propionate containing from about 15 to about 52% by weight propionyl, based on the total weight of the polymer.

In certain embodiments, the cellulose ester resin is chosen from at least one cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tri-propionate (CTP), or cellulose tributyrate (CTB), having a relative viscosity less than 2.5. In certain embodiments, the cellulose ester resin can be an individual grade with a relative viscosity lower than 2.5, or a blend of cellulose esters with one or more grades having a higher relative viscosity (i.e., greater than 2.5) and at least one grade having a relative viscosity less than 2.5. In one embodiment, the cellulose ester resin can be a blend of cellulose esters with one or more grades having a higher relative viscosity (i.e., greater than 2.5) and at least one grade having a lower relative viscosity (i.e., less than 2.5), where the blend results in an average relative viscosity lower than 2.5. The relative viscosity is determined for a 2% cellulose ester solution in acetone, measured at a temperature of 25° C. In certain embodiments, where the cellulose ester has a relative viscosity less than 2.5, the cellulose ester composition/resin can have decreased melt viscosity (or increased melt flow) at a similar Tg compared to a cellulose ester composition having a higher relative viscosity.

In certain embodiments, the cellulose ester is cellulose acetate propionate (CAP) having a propionyl content higher than 15 wt %, based on the total weight of the polymer. In certain embodiments, the cellulose ester is cellulose acetate propionate (CAP) having a propionyl content higher than 49% (propionic acid content more than 66%), based on the total weight of the CAP polymer. In certain embodiments, the cellulose ester is cellulose acetate propionate (CAP) having a propionyl content less than 38% (propionic acid content less than 50%), based on the total weight of the CAP polymer.

In certain embodiments, the cellulose ester is cellulose acetate butyrate (CAB) having a butyryl content higher than 15 wt %, based on the total weight of the polymer. In certain embodiments, the cellulose ester is cellulose acetate butyrate (CAB) having a butyryl content higher than 40% (butyric acid content more than 50%), based on the total weight of the CAB polymer. In certain embodiments, the cellulose ester is cellulose acetate butyrate (CAB) having a butyryl content less than 32% (butyric acid content less than 40%), or butyryl content in the range between 15 and 32 wt %, based on the total weight of the CAB polymer.

DETAILED DESCRIPTION

In one embodiment of the invention, a cellulose ester composition is provided comprising at least one cellulose ester, at least one EVA copolymer, and optionally, at least one plasticizer.

In embodiments, the cellulose ester utilized in this invention can be any cellulose ester having a sufficient content of salt or ester moieties of $C_3$ to $C_{10}$ acids, preferably propionate and/or butyrate moieties. Cellulose esters that can be used for the present invention generally comprise repeating units of the structure:

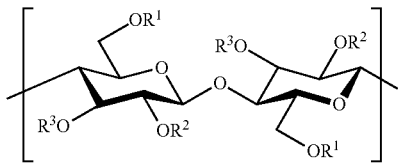

wherein $R^1$, $R^2$, and $R^3$ are selected independently from the group consisting of hydrogen or straight chain alkanoyl having from 2 to 10 carbon atoms. For cellulose esters, the substitution level is usually expressed in terms of degree of substitution (DS), which is the average number of non-OH substitutents per anhydroglucose unit (AGU). Generally, conventional cellulose contains three hydroxyl groups in each AGU unit that can be substituted; therefore, DS can have a value between zero and three. However, low molecular weight cellulose mixed esters can have a total degree of substitution slightly above 3 due to end group contributions. Native cellulose is a large polysaccharide with a degree of polymerization from 250-5,000 even after pulping and purification, and thus the assumption that the maximum DS is 3.0 is approximately correct. However, as the degree of polymerization is lowered, as in low molecular weight cellulose mixed esters, the end groups of the polysaccharide backbone become relatively more significant, thereby resulting in a DS that can range in excess of 3.0. Low molecular weight cellulose mixed esters are discussed in more detail subsequently in this disclosure. Because DS is a statistical mean value, a value of 1 does not assure that every AGU has a single substitutent. In some cases, there can be unsubstituted anhydroglucose units, some with two and some with three substitutents, and typically the value will be a non-integer. Total DS is defined as the average number of all of substituents per anhydroglucose unit. The degree of substitution per AGU can also refer to a particular substitutent, such as, for example, hydroxyl, acetyl, butyryl, or propionyl.

In embodiments, the cellulose ester utilized can be a cellulose triester or a secondary cellulose ester. Examples of cellulose triesters include, but are not limited to, cellulose tripropionate or cellulose tributyrate. Examples of secondary cellulose esters include cellulose acetate propionate and cellulose acetate butyrate.

In one embodiment of the invention, the cellulose ester can be chosen from cellulose propionate (CP), cellulose butyrate (CB), cellulose acetate propionate (CAP), cellulose acetate butyrate (CAB), cellulose propionate butyrate (CPB), cellulose acetate isobutyrate (CAIB), cellulose tripropionate (CTP), or cellulose tributyrate (CTB) and the like, or combinations thereof. Examples of some cellulose esters are described in U.S. Pat. Nos. 1,698,049; 1,683,347; 1,880,808; 1,880,560; 1,984,147, 2,129,052; and 3,617,201, incorporated herein by reference in their entirety to the extent that they do not contradict the statements herein. In one embodiment, the cellulose ester is CAP.

In one embodiment of the invention, the cellulose ester can be chosen from cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tripropionate (CTP), or cellulose tributyrate (CTB), but not from cellulose acetate (CA).

In embodiments, the cellulose esters can have a relative viscosity ($\eta_{rel}$) of greater than 6.0 to about 9.0, or about 6.1 to about 8.5, as measured at a temperature of 25° C. for a 2 wt % solution of the cellulose ester in acetone. Relative viscosity is the ratio of the efflux time of polymer solution to the solvent in which the polymer is dissolved. Relative viscosity in accordance with this disclosure can be determined as follows: a capillary type viscometer (CANNON miniPV-HX) is employed to measure the relative viscosity of a sample following ASTM D4603. Examples of cellulose esters include, but are not limited to, cellulose propionate (CP), cellulose butyrate (CB), cellulose acetate propionate (CAP), cellulose acetate butyrate (CAB), cellulose acetate iso-butyrate (CAIB), cellulose propionate butyrate (CPB), cellulose tripropionate (CTP), or cellulose tributyrate (CTB), and the like.

In certain embodiments of the invention, the cellulose ester has a total percentage of propionyl by weight in the range from 15 to 52%, or 20 to 52%, or 25 to 52%, or 30 to 52%, or 35 to 52%, or 40 to 52%, or 45 to 52%, or 49 to 52%, or 15 to 50%, or 20 to 50%, or 25 to 50%, or 30 to 50%, or 35 to 50%, or 40 to 50%, or 45 to 50%, 15 to less than 50%, or 20 to less than 50%, or 25 to less than 50%, or 30 to less than 50%, or 35 to less than 50%, or 40 to less than 50%, or 45 to less than 50%, or 35 to less than 50%, or 40 to less than 50%, or 45 to less than 50%, or 15 to 38%, or 20 to 38%, or 25 to 38%, or 30 to 38%, or 35 to 38%, or 15 to 35%, or 20 to 35%, or 25 to 35%, or 30 to 35%, or 15 to 30%, or 20 to 30%, or 25 to 30%, based on the total weight of the cellulose ester polymer.

In certain embodiments of the invention, the cellulose ester has a total percentage of butyryl by weight in the range from 15 to 57%, or 20 to 57%, or 25 to 57%, or 30 to 57%, or 35 to 57%, or 40 to 57%, or greater than 40 to 57%, or 41 to 57%, or 45 to 57%, or 50 to 57%, or 15 to 55%, or 20 to 55%, or 25 to 55%, or 30 to 55%, or 35 to 55%, or 40 to 55%, or greater than 40 to 55%, or 41 to 55%, or 45 to 55%, or 50 to 55%, 15 to 50%, or 20 to 50%, or 25 to 50%, or 30 to 50%, or 35 to 50%, or 40 to 50%, or greater than 40 to 50%, or 41 to 50%, or 45 to 50%, or 15 to 45%, or 20 to 45%, or 25 to 45%, or 30 to 45%, or 35 to 45%, or 40 to 45%, or greater than 40 to 45%, or 41 to 45%, or 15 to 35%, or 20 to 35%, or 25 to 35%, or 30 to 35%, or 15 to less than 32%, or 20 to less than 32%, or 25 to less than 32%, or 15 to 30%, or 20 to 30%, or 25 to 30%, based on the total weight of the cellulose ester polymer.

In certain embodiments, the cellulose ester is cellulose propionate butyrate or cellulose acetate propionate butyrate, with the combined propionate and butyryl content as a percentage of total weight of the polymer in the range from 15% to 55%, or 15% to 50%, or 15% to 45%, or 15% to 40%, or 15% to 35%, or 15% to 30%, or 15% to 25%, or 15% to 20%, or 20% to 55%, or 20% to 50%, or 20% to 45%, or 20% to 40%, or 20% to 35%, or 20% to 30%, or 20% to 25%, or 25% to 55%, or 25% to 50%, or 25% to 45%, or 25% to 40%, or 25% to 35%, or 25% to 30%, or 30% to 55%, or 30% to 50%, or 30% to 45%, or 30% to 40%, or 30% to 35%, or 35% to 55%, or 35% to 50%, or 35% to 45%, or 35% to 40%, 40% to 55%, or 40% to 50%, or 40% to 45%, or 40% to 55%, or 40% to 55%, or 40% to 55%, or 40% to 45%, or 45% to 55%, or 45% to 50%, or 50% to 55%.

Cellulose esters can be produced by any method known in the art. Examples of processes for producing cellulose esters are taught in Kirk-Othmer, Encyclopedia of Chemical Technology, 5$^{th}$ Edition, Vol. 5, Wiley-Interscience, New York (2004), pp. 394-444. Cellulose, the starting material for producing cellulose esters, can be obtained in different grades and sources such as from cotton linters, softwood pulp, hardwood pulp, corn fiber and other agricultural sources, and bacterial cellulose, among others.

One method of producing cellulose esters is esterification of the cellulose by mixing cellulose with the appropriate organic acids, acid anhydrides, and catalysts. Cellulose is then converted to a cellulose triester. Ester hydrolysis is then performed by adding a water-acid mixture to the cellulose triester, which can then be filtered to remove any gel particles or fibers. Water is then added to the mixture to precipitate the cellulose ester. The cellulose ester can then be washed with water to remove reaction by-products followed by dewatering and drying.

The cellulose triesters to be hydrolyzed can have three substitutents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate, and cellulose acetate butyrate. These cellulose esters can be prepared by a number of methods known to those skilled in the art. For example, cellulose esters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

After esterification of the cellulose to the triester, part of the acyl substitutents can be removed by hydrolysis or by alcoholysis to give a secondary cellulose ester. As noted previously, depending on the particular method employed, the distribution of the acyl substituents can be random or non-random. Secondary cellulose esters can also be prepared directly with no hydrolysis by using a limiting amount of acylating reagent. This process is particularly useful when the reaction is conducted in a solvent that will dissolve cellulose. All of these methods can be used to yield cellulose esters that are useful in this invention.

The most common commercial secondary cellulose esters are prepared by initial acid catalyzed heterogeneous acylation of cellulose to form the cellulose triester. After a homogeneous solution in the corresponding carboxylic acid of the cellulose triester is obtained, the cellulose triester is then subjected to hydrolysis until the desired degree of substitution is obtained. After isolation, a random secondary cellulose ester is obtained. That is, the relative degree of substitution (RDS) at each hydroxyl is roughly equal.

Some examples of cellulose esters useful in the present invention can be prepared using techniques known in the art and can be obtained from Eastman Chemical Company, Kingsport, Tenn., U.S.A., e.g., Eastman™ Cellulose Acetate Propionate CAP 482-20, Eastman™ Cellulose Acetate Propionate CAP 141-20, Eastman™ Cellulose Acetate Butyrate CAB 381-20, and Cellulose Acetate Butyrate CAB 171-15. Examples of some common cellulose esters, with relative viscosity values shown, are listed below in Table 1. In certain embodiments, common cellulose esters having a relative viscosity greater than 6.0 (as shown in Table 1) can be utilized in the present invention. In certain other embodiments, combinations of different common cellulose esters having relative viscosities greater than and less than 6.0 (as shown in Table 1) can be utilized.

TABLE 1

Common Cellulose Esters

| CE Grade | CE Material* | Relative Viscosity | Acetyl Wt % | propionyl Wt % | butyryl Wt % |
|---|---|---|---|---|---|
| 1 | CAP 482-20 | 7.40 | 1.3 | 48 | 0 |
| 2 | CP520-7(CTP) | 4.6 | 0 | 50 | 0 |
| 3 | CAB 381-20 | 8.47 | 13.5 | 0 | 37 |
| 4 | CAP 141-20 | 7.07 | 29.1 | 14.7 | 0 |
| 5 | CAB 500-5 | 5 | 2 | 0 | 47 |
| 6 | CAP 482-3 | 4.26 | 2 | 47 | 0 |
| 7 | CAP 202-29 | 8.04 | 24.48 | 18.07 | 0 |
| 8 | CA 398-3 | 3.89 | 39.8 | 0 | 0 |
| 9 | CAB381-0.1 | 1.8 | 13.5 | 0 | 38 |
| 10 | CAP 482-0.5 | 2.50 | 2.5 | 45 | 0 |

*CE Materials Manufactured by Eastman Chemical Company

In certain embodiments, cellulose esters having a relative viscosity less than 6.0 (e.g., as shown in Table 1) can be utilized. In certain other embodiments, combinations of different common cellulose esters grades having a relative viscosity greater than 6.0 and grades having a relative viscosity less than 6.0 (e.g., as shown in Table 1) can be utilized. In certain embodiments, which comprise cellulose esters having a relative viscosity less than 6.0 and EVA copolymers, cellulose ester compositions can be provided for applications requiring a Tg above 120° C., or above 130° C., or above 140° C.; and Izod impact values less than 150, or less than 125, or less than 100 J/m. In certain other embodiments, which comprise cellulose esters having a relative viscosity less than 6.0 and EVA copolymers, cellulose ester compositions can be provided for applications requiring a Tg above 100° C., or above 110° C., or above 120° C., and higher melt flow (or lower melt viscosity) compared to using cellulose esters having higher relative viscosity, where the cellulose ester compositions further comprise plasticizers of the types and amounts discussed herein. In one embodiment, the plasticizer is a type that is primarily, or essentially, or completely contained in the EVA copolymer discontinuous phase of the cellulose ester composition, and is not contained (except for possibly minute amounts) in the continuous cellulose ester polymer continuous phase.

In certain embodiments, cellulose esters having a relative viscosity less than 2.5 can be utilized. In certain other embodiments, combinations of different cellulose esters grades having a relative viscosity less than 2.5 and grades having a relative viscosity greater than 2.5 can be utilized. In certain embodiments, which comprise cellulose esters having a relative viscosity less than 2.5 and EVA copolymers, cellulose ester compositions can be provided for applications requiring a Tg above 120° C., or above 130° C., or above 140° C., and lower melt viscosity (or higher melt flow) compared to cellulose esters with higher relative viscosities.

In embodiments, the cellulose esters utilized in this invention can also contain chemical functionality and are described herein as either derivatized, modified, or functionalized cellulose esters. Functionalized cellulose esters can be produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride which links through an ester bond and provides acid functionality; mercaptosilanes which links through alkoxysilane bonds and provides mercapto functionality; and isocyanotoethyl methacrylate which links through a urethane bond and gives methacrylate functionality.

In one embodiment of the invention, functionalized cellulose esters are produced by reacting the free hydroxyl groups of the cellulose esters with a bifunctional reactant producing a cellulose ester with at least one functional group selected from the group consisting of unsaturation (double bonds), carboxylic acids, acetoacetate, acetoacetate imide, mercapto, melamine, and long alkyl chains.

Bifunctional reactants to produce cellulose esters containing unsaturation (double bonds) functionality are described in U.S. Pat. Nos. 4,839,230, 5,741,901, 5,871,573, 5,981,738, 4,147,603, 4,758,645, and 4,861,629; all of which are incorporated by reference to the extent they do not contradict the statements herein. In one embodiment, the cellulose esters containing unsaturation is produced by reacting a cellulose ester containing residual hydroxyl groups with an acrylic based compound and m-isopropyenyl-α,α'-dimethylbenzyl isocyanate. The grafted cellulose ester is a urethane-containing product having pendant (meth)acrylate and α-methylstyrene moieties. In another embodiment, the cellulose esters containing unsaturation is produced by reacting maleic anhydride and a cellulose ester in the presence of an alkaline earth metal or ammonium salt of a lower alkyl monocarboxylic acid catalyst, and at least one saturated monocarboxylic acid have 2 to 4 carbon atoms. In another embodiment, the cellulose esters containing unsaturation is produced from the reaction product of (a) at least one cellulosic polymer having isocyanate reactive hydroxyl functionality, and (b) at least one hydroxyl reactive poly (alpha,beta ethyleneically unsaturated) isocyanate.

Bifunctional reactants to produce cellulose esters containing carboxylic acid functionality are described in U.S. Pat. Nos. 5,384,163, 5,723,151, and 4,758,645; all of which are incorporated by reference to the extent they do not contradict the statements herein. In one embodiment, the cellulose esters containing carboxylic acid functionality is produced by reacting a cellulose ester and a mono- or di-ester of maleic or fumaric acid, thereby obtaining a cellulose derivative having double bond functionality. In another embodiment, the cellulose esters containing carboxylic acid functionality has a first and second residue, wherein the first residue is a residue of a cyclic dicarboxylic acid anhydride and the second residue is a residue of an oleophilic monocarboxylic acid and/or a residue of a hydrophilic monocarboxylic acid. In yet another embodiment, the cellulose esters containing carboxylic acid functionality are cellulose acetate phthalates, which can be prepared by reacting cellulose acetate with phthalic anhydride.

Bifunctional reactants to produce cellulose esters containing acetoacetate functionality are described in U.S. Pat. No. 5,292,877; which is incorporated by reference to the extent it does not contradict the statements herein. In one embodiment, the cellulose esters containing acetoacetate functionality are produced by contacting: (i) cellulose; (ii) diketene, an alkyl acetoacetate, 2,2,6, trimethyl-4H 1,3-dioxin-4-one, or a mixture thereof, and (iii) a solubilizing amount of solvent system comprising lithium chloride plus a carboxamide selected from the group consisting of 1-methyl-2-pyrolidinone, N,N dimethylacetamide, or a mixture thereof.

Bifunctional reactants to produce cellulose esters containing acetoacetate imide functionality are described in U.S. Pat. No. 6,369,214 which is incorporated by reference to the extent it does not contradict the statements herein. Cellulose esters containing acetoacetate imide functionality are the reaction product of a cellulose ester and at least one acetoacetyl group and an amine functional compound comprising at least one primary amine.

Bifunctional reactants to produce cellulose esters containing mercapto functionality are described in U.S. Pat. No. 5,082,914; which is incorporated by reference to the extent it does not contradict the statements herein. In one embodiment of the invention, the cellulose ester is grafted with a silicon-containing thiol component which is either commercially available or can be prepared by procedures known in the art. Examples of silicon-containing thiol compounds include, but are not limited to, (3-mercaptopropyl) trimethoxysilane, (3-mercaptopropyl)-dimethyl-methoxysilane, (3-mercaptopropyl)dimethoxymethylsilane, (3-mercaptopropyl)dimethylchlorosilane, (3-mercaptopropyl) dimethylethoxysilane, (3-mercaptopropyl)diethyoxymethylsilane, and (3-mercapto-propyl)triethoxysilane.

Bifunctional reactants to produce cellulose esters containing melamine functionality are described in U.S. Pat. No. 5,182,379; which is incorporated by reference to the extent it does not contradict the statements herein. In one embodiment, the cellulose esters containing melamine functionality are prepared by reacting a cellulose ester with a melamine compound to form a grafted cellulose ester having melamine moieties grafted to the backbone of the anhydroglucose rings of the cellulose ester. In one embodiment, the melamine compound is selected from the group consisting of methylol ethers of melamine and aminoplast resins.

Bifunctional reactants to produce cellulose esters containing long alkyl chain functionality are described in U.S. Pat. No. 5,750,677; which is incorporated by reference to the extent it does not contradict the statements herein. In one embodiment, the cellulose esters containing long alkyl chain functionality is produced by reaction of cellulose in a carboxamide diluents or a urea-based diluent with an acylating reagent using a titanium-containing specifies. Cellulose esters containing long alkyl chain functionality can be selected from the group consisting of cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

In certain embodiments, the cellulose ester is cellulose acetate propionate (CAP) having a propionyl content higher than 49% (propionic acid content more than 66%), based on the total weight of the CAP polymer. In certain embodiments, the cellulose ester is cellulose acetate propionate (CAP) having a propionyl content less than 38% (propionic acid content less than 50%), based on the total weight of the CAP polymer.

In certain embodiments, the cellulose ester is cellulose acetate propionate (CAP) having a propionyl content in the range from 15% to 52%, or 15% to 45%, or 15% to 38%, or 15% to 35%, or 15% to 30%, or 15% to 25%, or 20% to 52%, or 20% to 45%, or 20% to 38%, or 20% to 35%, or 20% to 30%, or 25% to 52%, or 25% to 45%, or 25% to 38%, or 25% to 35%, or 30% to 52%, or 30% to 45%, or 30% to 38%, or 35% to 52%, or 35% to 45%, or 35% to 38%, or 38% to 49%, or 49% to 52%.

In certain embodiments, the cellulose ester is cellulose acetate butyrate (CAB) having a butyryl content higher than 40% (butyric acid content more than 50%), based on the total weight of the CAB polymer. In certain embodiments, the cellulose ester is cellulose acetate butyrate (CAB) having a butyryl content less than 32% (butyric acid content less than 40%), based on the total weight of the CAB polymer.

In certain embodiments, the cellulose ester is cellulose acetate butyrate (CAB) having a butyryl content as a percentage of total weight of the polymer in the range from or 10% to 57%, or 10% to 50% or 10% to 45%, or 10% to 40%, or 10% to 32%, or 10% to 25%, or 10% to 18%, or 15% to 57%, or 15% to 50% or 15% to 45%, or 15% to 40%, or 15% to 32%, or 15% to 25%, or 15% to 18%, or 20% to 57%, or 20% to 50% or 20% to 45%, or 20% to 40%, or 20% to 32%, or 20% to 25%, or 25% to 57%, or 25% to 50%, or 25% to 45%, or 25% to 40%, or 25% to 32%, or 30% to 57%, or 30% to 50%, or 30% to 45%, or 35% to 57% or 35% to 50%, or 35% to 40%, or 40% to 57% or 40% to 50%, or 40% to 45%, or 45% to 57% or 45% to 50%.

In certain embodiments, the cellulose ester is cellulose propionate butyrate, or cellulose acetate propionate butyrate, with the combined propionyl and butyryl content as a percentage of total weight of the polymer in the range from 15% to 55%, or 15% to 50%, or 15% to 45%, or 15% to 40%, or 15% to 35%, or 15% to 30%, or 15% to 25%, or 15% to 20%, or 20% to 55%, or 20% to 50%, or 20% to 45%, or 20% to 40%, or 20% to 35%, or 20% to 30%, or 20% to 25%, or 25% to 55%, or 25% to 50%, or 25% to 45%, or 25% to 40%, or 25% to 35%, or 25% to 30%, or 30% to 55%, or 30% to 50%, or 30% to 45%, or 30% to 40%, or 30% to 35%, or 35% to 55%, or 35% to 50%, or 35% to 45%, or 35% to 40%, 40% to 55%, or 40% to 50%, or 40% to 45%, or 40% to 55%, or 40% to 55%, or 40% to 55%, or 40% to 45%, or 45% to 55%, or 45% to 50%, or 50% to 55%.

In embodiments of the invention, the EVA polymer can be any ethylene vinyl acetate rubber material that is compatible with the cellulose ester composition. By "compatible" is meant that the EVA polymer is of a type that results in a cellulose ester composition having both good clarity, maintaining Tg compared to the base cellulose ester (without EVA) and significantly increased toughness, preferably having an Izod Impact strength at 23° C. of at least 100 J/m, and which is clear and not hazy. In embodiments, the EVA polymer can be a single compatible polymer grade, a blend of different EVA compatible polymer grades, a combination of compatible and incompatible EVA polymer (e.g., if the "incompatible" EVA polymer is used on its own in a similar formulation), or a combination of compatible EVA polymer and another impact modifier, provided that the resulting cellulose ester composition has sufficient clarity and toughness. In embodiments, the EVA is not modified with maleic anhydride. In one embodiment, the EVA is not modified (e.g., functionalized or reacted) with any other chemical substituents. The EVA would not be considered modified (with any other chemical substituents) by adjusting the vinyl acetate content.

In embodiments, the ethylene/vinyl acetate (EVA) copolymers may be produced by known high-pressure and medium-pressure processes, optionally in solvents, such as t-butanol. In embodiments, the EVA copolymers have a vinyl acetate content of from 30 to 98%, by weight. In embodiments of the invention, compatible EVA copolymers have a vinyl acetate content in the range from 40 wt % to less than 80 wt %, or 40 to 70 wt %, preferably in the range from 50 to 65 wt %, or greater than 50 up to 65 wt %. In one embodiment, the cellulose ester composition contains at least one compatible EVA copolymer having a vinyl acetate (VA) composition from 40 to 70 wt %, preferably in the range from 50 to 65 wt %, or greater than 50 up to 65 wt %. In certain embodiments, the amount of such a compatible EVA copolymer (having a 40 to 70 wt %, preferably 50 to 65 wt %, or greater than 50 up to 65 wt % VA content) in the cellulose ester composition is from 0.5 to 40 wt %, or 1 to 35 wt %, or 2.5 to 30 wt %, or 5 to 30 wt %, or 10 to 30 wt %, or greater than 10 wt % up to 30 wt %, or 12 to 25 wt %, or 15 to 30 wt %, or 15 to 25 wt %, or 15 to 20 wt %, based on the total cellulose ester composition.

In one embodiment of the invention, multiple EVA copolymers having different vinyl acetate contents can be used, as long as the weight average vinyl acetate content of the EVA mixture ranges from 40 wt % to less than 80 wt %, or from 40 to 70 wt %, preferably in the range from 50 to 65 wt %, or greater than 50 up to 65 wt %. In certain embodiments, the total amount of this mixture of compatible EVA copolymers (having a weight average VA content in the range from 40 to 70 wt %, preferably in the range from 50 to 65 wt %, or greater than 50 up to 65 wt %) in the cellulose ester composition is from 0.5 to 40 wt %, or 1 to 35 wt %, or 2.5 to 30 wt %, or 5 to 30 wt %, or 10 to 30 wt %, or greater than 10 wt % up to 30 wt %, or 12 to 25 wt %, or 15 to 30 wt %, or 15 to 25 wt %, or 15 to 20 wt %, based on the total cellulose ester composition. In embodiments, the EVA (or EVA blend) has a VA content (or weight average VA content) in the range from 50 to 65 wt %, or greater than 50 up to 65 wt %, or 51 to 65 wt %, or 52 to 65 wt %, or 53 to 65 wt %, or 51 to 64 wt %, or 51 to 62 wt %, or 51 to 60 wt %, or 52 to 64 wt %, or 52 to 62 wt %, or 52 to 60 wt %, or 53 to 64 wt %, or 53 to 62 wt %, or 53 to 60 wt %, based on the weight of the EVA component.

In embodiments, the ethylene/vinyl acetate copolymers produced by the high-pressure process have melt index values (at 190° C. under a load of 2.16 kp according to DIN 53,735) of from 0.1 to 100 g, preferably from 1.0 to 10 g, more particularly from 4.5 to 6 g. The intrinsic viscosities as measured in tetralin at 120° C. are generally from 0.6 to 1.5 dl/g. The absolute molecular weights, as determined by the light scattering method, are preferably from 50,000 to about 1 million. The inconsistency factor (U) defined in accordance with the relation $M_w/M_n-1$ (G. Schulz, Z, phys. Chem. (B) 43 (1939), pages 25-34), is from 1.6 to 30. These copolymers are preferably soluble in hot hydrocarbons.

The ethylene/vinyl acetate copolymers produced, for example, by solution or emulsion polymerization and containing from 30 to 98%, by weight, preferably from 40 to 70%, by weight, of vinyl acetate have melt index values (190° C./2.16 kp) which may be in excess of 100 g, although the melt index range is preferably below 15 g, more particularly from 0.5 to 5 g. The absolute molecular weights, as measured by the light scattering method, are preferably from 40,000 to 1 million. The inconsistency factor (U) is from 1 to 6. The copolymers are soluble in hydrocarbons and alcohols and preferably have intrinsic viscosities in toluene of from 0.5 to 2.5 dl/g.

In one embodiment, one or more impact modifiers can be included with the compatible EVA copolymers, and, in certain embodiments, the impact modifiers can be any polymeric material classified as an elastomer with a glass transition temperature (Tg) below room temperature. Tg can be measured for example according to ASTM D3418 using a TA 2100 Thermal Analyst Instrument using a scan rate of 20° C./min. Several classes of impact modifier fit this description.

In one embodiment, the impact modifier can be selected from the class of materials known as modified polyolefins (or olefin copolymers), other than the EVA component (as discussed herein). In this class, the olefin is copolymerized with additional monomers that limit the crystallization of the polymer, increase the amount of the chain with Tg below room temperature, and reduce the modulus below 500 MPa. Examples of modified olefins include EMA (examples include Elvaloy 4051, Lotader 3410 and Lotader 8900), EBA, EEA, EPDM (examples include Royaltuf 498), and EPR.

In one embodiment, the impact modifier can be a block copolymer in which at least one segment of the chain has a Tg below room temperature, referred to as the soft segment, and at least one segment of the chain has a Tg or Tm above room temperature, referred to as the hard segment. These block copolymers are also commonly referred to as thermoplastic elastomers (TPEs). Examples of block compolymers of this class include styrenic materials such as SBS, SEBS, and SIS (examples include Kraton G1657MS, Kraton FG1901 G and Kraton FG1924 G); thermoplastic urethanes (TPU) (examples include Elastolan 1170Z, Estane 2355, Estane ALR CL87A and Estane ALR 72A); polyester-ether copolymers (examples include Ecdel 9966 and Hytrel 3078) or polyamide-ether copolymers (examples include Pebax 5533).

In one embodiment, the impact modifier can be selected from the class of emulsion-prepared materials known as core-shell impact modifiers. In one embodiment, the impact modifier is a MBS core-shell impact modifier such as a methacrylate-butadiene-styrene that has a core made out of butadiene-styrene copolymers and shell made out of methyl methacrylate-styrene copolymer. In another embodiment, the impact modifier is an acrylic core-shell impact modifier that has a core made from an acrylic polymer, such as butyl acrylate or styrene butyl acrylate, and shell from made from polymethylmethacrylate or styrene methylmethacrylate copolymer.

In embodiments, the MBS impact modifier can comprise graft polymer compositions comprising 10 to 70 percent by weight of a polymer or a copolymer of butadiene and grafts of firstly methyl(meth)acrylate and cross-linker, and secondly of styrene, and thirdly of methyl(meth)acrylate with an optional cross-linker.

Monomers suitable for polymerization with a conjugated diolefin and preferably with butadiene, can include alkenyl aromatic compounds and preferably vinyl aromatic compounds such as styrene, divinylbenzene, alpha-methyl styrene, vinyl toluene, hydrogenated styrene; lower (CZ—Cu) alkyl acrylates such as ethyl acrylate, n-propylacrylate, n-butyl acrylate, Z-methylbutylacrylate, 3-methylbutyl acrylate, amylacrylate, n-hexylacrylate, Z-ethylhexyl acrylate; lower (C2-C12) alkyl(meth)acrylates; acrylonitriles; olefins; and the like; or a combination of any of the foregoing.

Suitable cross-linking agents include divinylbenzene; di(meth)acrylates; diacrylates such as the diacrylate of mono-, di- or polyethylene glycol; their (meth)acrylates; divinyl sulfide; divinyl ether; vinyl acrylate; vinyl(meth) acrylate; trivinylbenzene; trimethylolpropane; tri(meth) acrylate; triallyl cyanurate and triallyl isocyanurate.

In one embodiment, the MBS core-shell impact modifier can comprise a copolymer of butadiene and styrene and most preferably a terpolymer of butadiene, styrene, and divinylbenzene. Although the relative amounts of the monomers which comprise the copolymeric substrate may vary, the butadiene component will typically comprise from about 30 to 100 parts by weight, the styrene component will comprise from 0 to about 70 parts by weight, and the divinylbenzene component will comprise from 0 to about 5 parts by weight based upon 100 parts by weight of butadiene, styrene, and divinylbenzene combined. In an embodiment, the copolymer substrate can comprise from about 50 to about 90 parts by weight of butadiene, from about 10 to about 50 parts by weight of styrene, and from 0 to about 5 parts by weight of divinylbenzene on the same basis, and most preferably, from about 65 to about 85 parts by weight of butadiene, from about 15 to about 35 parts by weight of styrene, and from about 0.5 to about 2.0 parts by weight of divinylbenzene on the same basis.

Examples of methacrylate-butadiene-styrene core shell polymers are those described in, but not limited to, patents U.S. Pat. Nos. 4,446,585, 5,534,594, and 6,331,580. MBS core-shell impact modifiers can be obtained as Kane Ace B564 from Kaneka, Clearstrength from Arkema, Metablen C and Metablen E from Mitsubishi Chemical, Paraloid from Dow, and Visiomer from Evonik.

In one embodiment of the present invention, the core shell impact modifier is an acrylic impact modifier comprising about 25 to 95 weight percent of a first elastomeric phase polymerized from a monomer system comprising about 75 to 99.8 percent by weight of a (C1 to C6) alkyl acrylate, 0.1 to 5 percent by weight cross-linking monomer, and 0.1 to 5 percent by weight graft linking monomer, and about 75 to 5 weight percent of a final, rigid thermoplastic phase free of epoxy groups polymerized in the presence of said elastomeric phase.

Examples of useful acrylates are methyl acrylate, ethyl acrylate, butyl acrylate, 2-ethylhexyl acrylate and the like. In some embodiments, the acrylates are n-butyl acrylate and ethyl acrylate.

Graft linking monomer is defined as polyethylenically unsaturated monomer which has both a highly reactive double bond and a double bond of lower reactivity such that the highly reactive double bond tends to polymerize during the first stage monomer polymerization leaving a remaining double bond for polymerization during the next stage polymerization and thereby to graft link the first stage with the second stage polymers. In some embodiments, the graft linking monomers are allyl methacrylate, allyl acrylate and diallyl maleate. In an embodiment, 0.05 to 3 percent graft linking monomer is present based on first stage monomer systems. Cross linking monomer is also preferably present, generally in amounts of about 0.05 to 3 percent by weight based on first stage monomer system, and is defined as a polyethylenically unsaturated monomer having at least two double bonds of about equal reactivity so as to cause cross-linking in the first stage polymerization. Examples of typical cross-linking monomers are 1,3-butylene diacrylate, 1,3-butylene dimethacrylate, divinylbenzene and the like.

By "epoxy functionality" is meant the epoxy units which are pendant from the final stage polymer. In some embodiments, epoxy functionality is incorporated into the final stage polymer by use of epoxy containing monomer such as glycidyl acrylate or glycidyl methacrylate in the final stage monomer mixture.

Examples of acrylic core shell polymers are those described in, but not limited to, patents U.S. Pat. Nos.

3,448,173, 3,655,825, and 3,853,968. Examples of suitable acrylic impact modifiers are Kane Ace ECO100 from Kaneka, Durastrength from Arkema, Elvaloy and Elvaloy HP from DuPont, Metablen W from Mitsubishi Chemical, and Paraloid from Dow.

In one class of this embodiment, the impact modifier is an ABS core-shell impact modifier that has a core made out of butadiene-styrene copolymers and shell made out of acrylonitrile-styrene copolymer. Examples of ABS core-shell impact modifiers include Blendex from Galata Chemicals and Elix from Elix Polymers.

In one class of this embodiment, the impact modifier is a silicone-acrylic core-shell impact modifier that has a core made out of silicone-acrylic rubber and shell made out of PMMA copolymer or methyl methacrylate-styrene copolymer. Examples of silicone-acrylic core-shell impact modifiers include an Metablen S from Mitsubishi Chemical Company.

In one embodiment, the impact modifier has a neutral acidity. It is believed that this will help prevent the cellulose esters from degrading during the melt processing of the compositions.

In one embodiment, the impact modifier can be either a non-reactive impact modifier or a reactive impact modifier, or combination of both. The impact modifiers used can also improve mechanical and physical properties of the cellulose ester compositions.

In one embodiment, where non-reactive impact modifiers are utilized, the impact modifier contains a first polymeric chain segment that is more chemically or physically compatible with the cellulose ester than another polymeric chain segment. In an embodiment, the first segment contains polar functional groups, which provide compatibility with the cellulose ester, including, but not limited to, such polar functional groups as ethers, esters, amides, alcohols, amines, ketones and acetals. Compatibility is defined by the preferential interaction of the first polymer chain segment with the cellulose ester polymer relative to the second segment and can mean molecular scale or microscale interactions. The first segment may consist of oligomers or polymers of the following: cellulose esters; cellulose ethers; polyoxyalkylene, such as, polyoxyethylene, polyoxypropylene, polyoxybutylene; polyglycols, such as, polyethylene glycol, polypropylene glycol, polybutylene glycol; polyesters, such as, polycaprolactone, polylactic acid, aliphatic polyesters, aliphatic-aromatic copolyesters; polyacrylates and polymethacrylates; polyacetals; polyvinylpyrrolidone; polyethylenevinyl acetate; polyvinyl acetate; and polyvinyl alcohol. In one embodiment, the first segment is polyethylenevinyl acetate; polyoxyethylene or polyvinyl alcohol.

In embodiments, the second segment can be either saturated or unsaturated hydrocarbon groups or contain both saturated and unsaturated hydrocarbon groups. The second segment can be an oligomer or a polymer. In one embodiment of the invention, the second segment of the non-reactive impact modifier is selected from the group consisting of polyolefins, polydienes, polyaromatics, and copolymers. An example of a polyaromatic second segment is polystyrene. An example of a copolymer second segment is styrene/butadiene copolymer.

The first and second segments of the non-reactive impact modifiers can be in a diblock, triblock, branched or comb structure. The molecular weight, weight average (Mw), of the non-reactive impact modifiers can range from about 300 to about 20,000 or from about 500 to about 10,000 or from about 1,000 to about 5,000. The segment ratio of the non-reactive impact modifiers can range from about 15 to about 85% polar first segments to about 15 to about 85% nonpolar second segments.

Examples of non-reactive impact modifiers include, but are not limited to, ethoxylated alcohols, ethoxylated alkylphenols, ethoxylated fatty acids, polyethylenevinyl acetate, block polymers of propylene oxide and ethylene oxide, ethylene/propylene terpolymers, functionalized polyolephins, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids can include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive impact modifiers can be synthesized in situ in the cellulose ester composition by reacting cellulose ester-compatible compounds. These compounds can be, for example, telechelic oligomers, which are defined as prepolymers capable of entering into further polymerization or other reaction through their reactive end groups. In one embodiment of the invention, these in situ impact modifiers can have higher molecular weight, weight average (Mw), from about 10,000 to about 1,000,000.

In another embodiment of the invention, the impact modifier can be reactive. The reactive impact modifier can comprise a polymer or oligomer compatible with one component of the composition and functionality capable of reacting with another component of the composition. In embodiments, there are two types of reactive impact modifiers that can be used. The first reactive impact modifier has a hydrocarbon chain that is compatible with the cellulose ester and also has functionality capable of reacting with the cellulose ester. Such functional groups include, but are not limited to, carboxylic acids, anhydrides, acid chlorides, epoxides, and isocyanates. Specific examples of this type of reactive impact modifier include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive impact modifiers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

Reactive polyolefin impact modifiers can be obtained as Lotader, Fusabond, Elvloy PTW, Lotryl, Elvaloy AC, InterLoy).

The second type of reactive impact modifier has a polar chain that is compatible with the cellulose ester and also has functionality capable of reacting with the cellulose ester. Examples of these types of reactive impact modifiers include cellulose esters or polyethylene glycols with olefin or thiol functionality. Reactive polyethylene glycol impact modifiers with olefin functionality include, but are not limited to, polyethylene glycol allyl ether and polyethylene glycol acrylate. An example of a reactive polyethylene glycol impact modifier with thiol functionality includes polyethylene glycol thiol. An example of a reactive cellulose ester impact modifier includes mercaptoacetate cellulose ester.

In embodiments of the invention, the amount of impact modifier in the cellulose ester composition can range from about 1 wt % to about 15 wt % or from about 5 wt % to about 10 wt % based on the weight of the cellulose ester composition. In certain embodiments, the cellulose ester composition comprises 55 to 98 wt % of at least one cellulose ester, preferably CAP; 1 to 30 wt % of at least one EVA copolymer, preferably an EVA having a VA content from 40 to 70 wt %, preferably 50 to 65 wt %, or greater than 50 up to 65 wt %, or a blend of EVA (having different VA content), the blend having an average VA content from 45 to 65 wt %, or 50 to 65 wt %, or greater than 50 up to 65 wt %; and 1 to 15 wt % of at least one impact modifier, preferably a core-shell impact modifier.

In one embodiment, the cellulose ester and EVA copolymer composition is transparent, with light transmission of at least 70%, or at least 75%, or at least 80%, or at least 85%, or at least 90%, measured according to ASTM D1003 using a 3.2 mm plaque after injection molding at a barrel set point of 249° C. and a residence time of 5 min. In certain embodiments, the polymer-based resin has transmission in the range from 70% to 95%, or 75% to 95%, or 80% to 95%, or 85% to 95%, or 90% to 95%, or 70% to 90%, or 75% to 90%, or 80% to 90%, or 85% to 90%, measured according to ASTM D1003 using a 3.2 mm plaque after injection molding at a barrel set point of 249° C. and a residence time of 5 min. In one class of this embodiment, the cellulose ester composition comprising the EVA copolymer has a percent haze of less than 10%. In embodiments, the cellulose ester composition comprising the EVA polymer has a percent haze of less than 8%, or less than 6%, or less than 5%.

In another embodiment, the refractive index (RI) of the EVA copolymer is sufficiently close to that of the cellulose esters to provide a composition with high transmission and low haze. In one embodiment, the EVA copolymer has a RI that close to the RI of the cellulose ester of about 1.46-1.48 to provide clear compositions. In embodiments, the EVA copolymer and cellulose ester components have a difference in refractive index, RI (second component)-RI (first component) (e.g., RI of CE-RI of EVA), of about 0.006 to about −0.0006, and the blend has a percent transmittance of at least 75%, and a haze of 10% or less, and more preferably 5% or less.

In embodiments of the invention, the amount of EVA copolymer in the cellulose ester composition can range from about 0.5 wt % to about 40 wt %, or from about 1 wt % to about 35 wt %, or from about 2.5 wt % to about 30 wt %, or from about 5 wt % to about 25 wt %, or from about 5 wt % to about 20 wt %, or from about 5 wt % to about 15 wt %, or from about 5 wt % to about 10 wt %, or from about 10 wt % to about 30 wt %, or from about 10 wt % to about 25 wt %, or from about 10 wt % to about 20 wt %, or from about 10 wt % to about 15 wt %, or from greater than 10 wt % to about 30 wt %, or from greater than 10 wt % to about 25 wt %, or from greater than 10 wt % to about 20 wt %, or from greater than 10 wt % to about 15 wt %, based on the weight of the cellulose ester composition.

In another embodiment of the invention, the cellulose ester compositions further comprise at least one additional polymeric component as a blend (with the cellulose ester) in an amount from 5 to 95 weight %, based on the total cellulose ester composition. Suitable examples of the additional polymeric component include, but are not limited to, nylon; polyesters; polyamides; polystyrene; other cellulose esters, cellulose ethers; polystyrene copolymers; styrene acrylonitrile copolymers; polyolephins; polyurethanes; acrylonitrile butadiene styrene copolymers; poly(methylmethacrylate); acrylic copolymers; poly(ether-imides); polyphenylene oxides; polyvinylchloride; polyphenylene sulfides; polyphenylene sulfide/sulfones; poly(ester-carbonates); polycarbonates; polysulfones; poly lactic acid; poly butylenesuccinate; polysulfone ethers; and poly(ether-ketones) of aromatic dihydroxy compounds; or mixtures of any of the foregoing polymers. The blends can be prepared by conventional processing techniques known in the art, such as melt blending or solution blending. In certain embodiments, the total amount of additional polymeric compounds (not including the EVA) is less than 25 wt %, or less than 20 wt %, or less than 15 wt %, or less than 10 wt %, or less than 5 wt %, or none, based on the total weight of the cellulose ester composition.

In one embodiment of the invention, in addition to the EVA copolymer, the composition can contain a plasticizer. In embodiments, the plasticizer utilized in this invention can be any that is known in the art that can reduce the glass transition temperature and/or the melt viscosity of the cellulose ester to improve melt processing characteristics. The plasticizer may be any plasticizer suitable for use with a cellulose ester. The plasticizer level should be lower than the normal (or typical) plasticizer level utilized in conventional/commercial cellulose esters; so that the compositions have higher Tg than fully plasticized cellulose ester compositions, good toughness and good flow. In embodiments, the plasticizer is present in an amount that does not substantially reduce the Tg of the cellulose ester composition compared to a similar composition without the plasticizer. In embodiments, the Tg does not change (e.g., reduce) more than 20%, or 15%, or 10%, or 5%, or 2%, as a result of including the plasticizer.

The plasticizer can be either monomeric or polymeric in structure. In one embodiment, the plasticizer is at least one selected from the group consisting of an aromatic phosphate ester plasticizer, alkyl phosphate ester plasticizer, dialkylether diester plasticizer, tricarboxylic ester plasticizer, polymeric polyester plasticizer, polyglycol diester plasticizer, polyester resin plasticizer, aromatic diester plasticizer, aromatic trimester plasticizer, aliphatic diester plasticizer, carbonate plasticizer, epoxidized ester plasticizer, epoxidized oil plasticizer, benzoate plasticizer, polyol benzoate plasticizer adipate plasticizer, a phthalate plasticizer, a glycolic acid ester plasticizer, a citric acid ester plasticizer, a hydroxyl-functional plasticizer, or a solid, non-crystalline resin plasticizer.

In one embodiment of the invention, the plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate, diethylene glycol dibenzoate, dipropylene glycol dibenozoate, or triethylene glycol dibenzoate.

In another embodiment of the invention, the plasticizer can be selected from at least one of the following: esters comprising: (i) acid residues comprising one or more residues of: phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In another embodiment of the invention, the plasticizer can be selected from at least one of the following: esters comprising: (i) at least one acid residue selected from the group consisting of phthalic acid, adipic acid, trimellitic acid, succinic acid, benzoic acid, azelaic acid, terephthalic acid, isophthalic acid, butyric acid, glutaric acid, citric acid and phosphoric acid; and (ii) at least one alcohol residue selected from the group consisting of aliphatic, cycloaliphatic, and aromatic alcohol containing up to about 20 carbon atoms.

In another embodiment of the invention, the plasticizer can comprise alcohol residues where the alcohol residues is at least one selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In another embodiment of the invention, the plasticizer can be selected from at least one of the following: aliphatic polyesters comprising $C_2$-$C_{10}$ diacid residues, for example, malonic acid, succinic acid, glutaric acid, adipic acid, pimelic acid, suberic acid, azelaic acid, and sebacic acid; and $C_2$-$C_{10}$ diol residues.

In another embodiment, the plasticizer can comprise diol residues which can be residues of at least one of the following $C_2$-$C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight, weight average (Mw), of the polyglycol can range from about 200 to about 2000.

In another embodiment of the invention, the plasticizer comprises at least one of the following: Resoflex® R296 plasticizer, Resoflex® 804 plastocizer, SHP (sorbitol hexapropionate), XPP (xylitol pentapropionate), XPA (xylitol pentaacetate), GPP (glucose pentaacetate), GPA (glucose pentapropionate) and APP (arabitol pentapropionate).

In another embodiment of the invention, the plasticizer comprises one or more of: A) from about 5 to about 95 weight % of a $C_2$-$C_{12}$ carbohydrate organic ester, wherein the carbohydrate comprises from about 1 to about 3 monosaccharide units; and B) from about 5 to about 95 weight % of a $C_2$-$C_{12}$ polyol ester, wherein the polyol is derived from a $C_5$ or $C_6$ carbohydrate. In one embodiment, the polyol ester does not comprise or contain a polyol acetate or polyol acetates.

In another embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In another embodiment of the invention, the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment, the plasticizer comprises at least one carbohydrate ester and the carbohydrate portion of the carbohydrate ester comprises an α-anomer, a β-anomer or a mixture thereof.

In another embodiment, the plasticizer can be selected from at least one of the following: propylene glycol dibenzoate, glyceryl tribenzoate, diethylene glycol dibenzoate, triethylene glycol dibenzoate, di propylene glycol dibenzoate, and polyethylene glycol dibenzoate.

In another embodiment of the invention, the plasticizer can be a solid, non-crystalline resin. These resins can contain some amount of aromatic or polar functionality and can lower the melt viscosity of the cellulose esters. In one embodiment of the invention, the plasticizer can be a solid, non-crystalline compound (resin), such as, for example, rosin; hydrogenated rosin; stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

In another embodiment of the invention, the plasticizer is at least one plasticizer selected from the group consisting of: triacetin, trimethyl phosphate, triethyl phosphate, tributyl phosphate, triphenyl phosphate, triethyl citrate, acetyl trimethyl citrate, acetyl triethyl citrate, acetyl tributyl citrate, tributyl-o-acetyl citrate, dibutyl phthalate, diaryl phthalate, diethyl phthalate, dimethyl phthalate, di-2-methoxyethyl phthalate, di-octyl phthalate, di-octyl adipate, dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, tribenzoin, polycaprolactone, glycerin, glycerin esters, diacetin, glycerol acetate benzoate, polyethylene glycol, polyethylene glycol esters, polyethylene glycol diesters, di-2-ethylhexyl polyethylene glycol ester, triethylene glycol bis-2-ethyl hexanoate glycerol esters, diethylene glycol, polypropylene glycol, polyglycoldiglycidyl ethers, dimethyl sulfoxide, N-methyl pyrollidinone, $C_1$-$C_{20}$ dicarboxylic acid esters, dimethyl adipate, di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, γ-valerolactone, alkylphosphate esters, aryl phosphate esters, phospholipids, eugenol, cinnamyl alcohol, camphor, methoxy hydroxy acetophenone, vanillin, ethylvanillin, 2-phenoxyethanol, glycol ethers, glycol esters, glycol ester ethers, polyglycol ethers, polyglycol esters, ethylene glycol ethers, propylene glycol ethers, ethylene glycol esters, propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, diethylene glycol dibenzoate, dipropylene glycol dibenozoate, triethylene glycol dibenzoate, butylated hydroxytoluene, butylated hydroxyanisol, sorbitol, xylitol, ethylene diamine, piperidine, piperazine, hexamethylene diamine, triazine, triazole, pyrrole, and any combination thereof.

The amount of plasticizer in the cellulose ester composition can range from 0 to about 15 weight percent based on the weight of the cellulose ester composition. In one embodiment, the amount can range up to about 15 weight percent based on the weight of the cellulose ester composition. In another embodiment, the amount can range up to about 10 weight percent based on the weight of the cellulose ester composition. In another embodiment, the amount can range up to about 5 weight percent based on the weight of the cellulose ester composition or up to about 3 weight percent based on the weight of the cellulose ester composition.

In another embodiment of the invention, the composition contains no plasticizer. In embodiments, the composition contains no polyether ester compounds. In embodiments, the composition contains no adipic acid compounds. In certain embodiments, the cellulose ester composition comprises 65-99 wt % of one or more cellulose esters, 1-35 wt % of one or more EVA copolymers, and less than 5 wt % total of other components, based on the total weight of the cellulose ester composition. In certain embodiments, such other components do not include plasticizers, polyether ester compounds or adipic acid compounds.

In another embodiment of the invention, the composition is melt processable. Melt processability generally refers to the ability to thermally process the materials below their degradation temperature to obtain homogeneous pellets or plastic articles. For example, the compositions described can be melt extruded on a Werner & Pflerderer 30 mm twin screw extruder at a throughput of 35 lbs/hour with screw speed of 250 rpm and barrel temperature of 240° C. and/or injection molded on a Toyo 110 injection molding machine with barrel temperature of 240° C. and mold temperature of 160° F. with minimal molecular weight degradation (e.g., less than 5% decrease in MW from the initial MW) or color degradation (e.g., less than 5% increase in haze or 5% decrease in transmission, based on a scale or 0 to 100%).

In one embodiment of this invention, a melt processable cellulose ester composition is provided comprising 1 wt % to 35 wt %, or 2.5 wt % to 30 wt % of EVA copolymers, and no plasticizer, and a glass transition temperature (Tg) of at least 120° C. (measured at 20° C./min according to ASTM D3418 as described further herein), and notched Izod impact strength value of greater than 100 J/m (measured according to ASTM D256 on 3.2 mm thick bars at 23° C.), and spiral flow values of at least 38 centimeters (15 inches) when measured using the procedure described herein at a barrel temperate of 240° C. Unless specified otherwise, Notched Izod Impact Strength was performed on molded bars after notching according to ASTM Method D256 after conditioning at 23° C. and 50% RH for 48 hours, on 3.2 mm thick bars at 23° C.

Spiral flow was determined as follows: a reciprocating screw injection molding machine having 110 tons of clamping force with a screw diameter of 32 mm was equipped with a water-cooled, cold runner mold with a spiral-shaped cavity having dimensions of 0.50" wide×0.030" deep×60.00" in length was used. The cavity was fed via a 3.5" long cold sprue with a nominal 0.400" diameter and 3-degree taper, followed by a 1.0" long cold runner with 0.30" nominal diameter, followed by a rectangular gate 0.25" wide×0.030" thick×0.10" long. Variables controlled for the range of experimentation included resin drying, injection unit barrel temperature, mold temperature, initial injection speed, injection pressure limit, screw rotation speed and back pressure on screw recovery, injection time, and cycle time. For each combination of variables, responses included actual melt temperature and distance of melt travel in the spiral-shaped cavity, excluding the runner and gate. The injection process was allowed to stabilize at each set of conditions—typically 10 to 15 shots—and then 10 molded specimens were collected for an average reported flow length. All materials were molded using pressure control, with mold temperature of 120° F., initial injection speed of 1 in/s, injection unit pressure limit of 2000 psi, injection time of 5 s, cycle time of 32 s, maximum cushion of 0.2", screw recovery rotation speed of 150 rpm, and screw recovery back pressure of 100 psi.

In another embodiment of the invention, the compositions have a melt viscosity at 230° C. and 100 rad/s of 10,000 P or below measured by a plate-plate melt rheometer such as a Rheometrics Dynamic Analyzer (RDA II) with 25 mm diameter parallel plates, 1 mm gap and 10% strain measured in accordance with ASTM D4440 using frequency scan of between 1 rad/sec and 100 rad/sec.

In one embodiment, in addition to the EVA copolymer or mixtures of EVA copolymers, the melt processable cellulose ester compositions comprise 0 to 15 wt % of impact modifiers, 0 to 15 wt % of plasticizers, and have a Tg greater than 120° C. In another embodiment, the melt processable cellulose ester compositions comprise 0 to 15 wt % of impact modifiers, 0 to 10 wt % of plasticizers, and a Tg greater than 130° C. In yet another embodiment, melt processable cellulose ester compositions comprise 0 to 10 wt % of impact modifiers, 0 to 10 wt % of plasticizers, and a Tg greater than 140° C. In another embodiment, melt processable cellulose ester compositions comprising 0 to 10 wt % of impact modifiers, 0 to 5 wt % of plasticizers, and a Tg greater than 140° C.

In another embodiment of the invention, the cellulose ester compositions have a Tg similar to that of the base cellulose ester polymer with a drop of only a few degrees Celsius (e.g., less than 5° C., or less than 2° C.) with the incorporation of an EVA copolymer or mixtures of EVA copolymers and no plasticizer. In embodiments, impact properties of these composition also exceed 100 J/m (notched Izod impact strength at 23° C.).

In embodiments of the invention, the polymer-based resin has a Tg greater than 100° C., or greater than 110° C., or greater than 120° C. In certain embodiments, the polymer-based resin has a Tg of at least 120° C., or at least 125° C., or at least 130° C., or at least 135° C., or at least 140° C. In certain embodiments, the polymer-based resin has a Tg in the range from 100° C. to 150° C., 100° C. to 145° C., 100° C. to 140° C., 100° C. to 135° C., 100° C. to 130° C., 100° C. to 125° C., 110° C. to 150° C., 110° C. to 145° C., 115° C. to 150° C., 115° C. to 145° C., 120° C. to 150° C., 120° C. to 145° C., 125° C. to 150° C., 125° C. to 145° C., 130° C. to 150° C., 130° C. to 145° C., 135° C. to 150° C., 135° C. to 145° C., 140° C. to 150° C., 140° C. to 145° C., or 145° C. to 150° C.

In embodiments of the invention, the polymer-based resin has a notched izod impact strength of at least 80 J/m, or at least 90 J/m, or at least 100 J/m, or at least 110 J/m, or at least 120 J/m, or at least 130 J/m, or at least 140 J/m, or at least 150 J/m, or at least 160 J/m, or at least 170 J/m, or at least 180 J/m, or at least 190 J/m, or at least 200 J/m, as measured according to ASTM D256 using a 3.2 mm thick bar that has been subjected to 50% relative humidity for 48 hours at 23° C. In certain embodiments, the polymer-based resin has a notched izod impact strength in the range of from about 80 J/m to about 500 J/m, from about 80 J/m to about 400 J/m, from about 80 J/m to about 300 J/m, from about 80 J/m to about 200 J/m, from about 100 J/m to about 500 J/m, from about 100 J/m to about 400 J/m, from about 100 J/m to about 300 J/m, from about 100 J/m to about 200 J/m, from about 120 J/m to about 500 J/m, from about 120 J/m to about 400 J/m, from about 120 J/m to about 300 J/m, from about 120 J/m to about 200 J/m, from about 150 J/m to about 500 J/m, from about 150 J/m to about 400 J/m, from about 150 J/m to about 300 J/m, from about 150 J/m to about 200 J/m, from about 170 J/m to about 500 J/m, from about 170 J/m to about 400 J/m, from about 170 J/m to about 300 J/m, from about 170 J/m to about 200 J/m, from 180 J/m to about 500 J/m, from about 180 J/m to about 400 J/m, from about 180 J/m to about 300 J/m, from about 180 J/m to about 200 J/m, from 190 J/m to about 500 J/m, from about 190 J/m to about 400 J/m, from about 190 J/m to about 300 J/m, from about 190 J/m to about 200 J/m, from 200 J/m to about 500 J/m, from about 200 J/m to about 400 J/m, or from about 200 J/m to about 300 J/m, as measured according to ASTM D256 using a 3.2 mm thick bar that has been subjected to 50% relative humidity for 48 hours at 23° C.

In certain embodiments, the polymer-based resin has a notched izod impact strength of at least 300 J/m, or at least 325 J/m, or at least 350 J/m, or at least 400 J/m, or at least 450 J/m, or at least 500 J/m, as measured according to ASTM D256 using a 3.2 mm thick bar that has been subjected to 50% relative humidity for 48 hours at 23° C. In certain embodiments, where the notched izod impact strength is at least 300 J/m, or at least 325 J/m, or at least 350 J/m, or at least 400 J/m, or at least 450 J/m, or at least 500 J/m, the Tg can be in the range from 80° C. to 130° C., 80° C. to 125° C., 80° C. to 120° C., 85° C. to 130° C., 85° C. to 125° C., 90° C. to 130° C., 90° C. to 125° C., 95° C. to 130° C., 95° C. to 125° C., 100° C. to 130° C., 100° C. to 125° C., 105° C. to 130° C., 105° C. to 125° C., 110° C. to 130° C., 110° C. to 125° C., or 110° C. to 120° C.

In certain embodiments of the invention, 3.2 mm thick plaques of the polymer-based resin exhibit ductile failure as defined in section X1.8 of ASTM D3763 when tested by instrumented impact according to ASTM D3763.

In embodiments of the invention, the polymer-based resin has a flexural modulus of greater than 1800 MPa as measured according to ASTM D790 using a 3.2 mm thick bar hat has been subjected to 50% relative humidity for 48 hours at 23° C. In certain embodiments, the polymer-based resin has a flexural modulus of at least 1900 MPa, at least 2000 MPa, at least 2100 MPa, at least 2200 MPa, at least 2300 MPa, or at least 2400 MPa, as measured according to ASTM D790 using a 3.2 mm thick bar hat has been subjected to 50% relative humidity for 48 hours at 23° C. In certain embodiments, the polymer-based resin has a flexural modulus is in the range of from about 1800 to about 3000 MPa, from about 1900 to about 3000 MPa, from about 2000 to about 3000 MPa, from about 2100 to about 3000 MPa, from about 2200 to about 3000 MPa, from about 2300 to about 3000 MPa, from about 2400 to about 3000 MPa, or from about 2500 to about 3000 MPa. as measured according to ASTM D790 using a 3.2 mm thick bar hat has been subjected to 50% relative humidity for 48 hours at 23° C. In certain embodiments, the polymer-based resin has a flexural modulus is in the range of from about 1900 to about 2500 MPa, from about 1900 to about 2800 MPa, or from about 1900 to about 3000 MPa, as measured according to ASTM D790 using a 3.2 mm thick bar hat has been subjected to 50% relative humidity for 48 hours at 23° C.

In certain embodiments of the invention, the cellulose ester compositions contain 2.5 wt %-30 wt % EVA copolymer or mixtures of EVA copolymers, based on the total weight of the cellulose ester composition, have Tg values greater than 120° C., notched Izod impact strength values greater than 100, or 125, or 150 J/m, and viscosities at 230° C. and 100 rad/sec less than 10,000 P.

In certain embodiments of the invention, the cellulose ester compositions contain 2.5 wt %-30 wt % EVA copolymer or mixtures of EVA copolymers, based on the total weight of the cellulose ester composition, have Tg values greater than 120° C., notched Izod impact strength values greater than 100, or 125, or 150 J/m, and a light transmission value greater than 80%, or at least 85%, or at least 90%, measured according to ASTM D1003 using a 3.2 mm plaque after injection molding at a barrel set point of 249° C. and a residence time of 5 min.

One problem that may occur when cellulose esters containing no or low levels of plasticizer are melt processed on screw plasticating injection molding machines is that the screw may have difficulty recovering smoothly, leading to poor material feed and a "squeaking" sound. It has surprisingly been found that addition of EVA copolymers in accordance with embodiments of this invention can eliminate these problems during injection molding.

In certain embodiments of the invention, the cellulose ester compositions contain 2.5 wt %-30 wt % EVA copolymer or mixtures of EVA copolymers, based on the total weight of the cellulose ester composition, have Tg values greater than 120° C., notched Izod impact strength values greater than 100, or 125, or 150 J/m, and do not squeak or have screw recovery issues during injection molding at a barrel set point of 249° C.

In certain embodiments of the invention, the cellulose ester compositions contain 2.5 wt %-30 wt % of an EVA copolymer or mixtures of EVA copolymers (having a VA content or weight average VA content from 40 to 70 wt %, preferably 50 to 65 wt %, or greater than 50 up to 65 wt %), based on the total weight of the cellulose ester composition, have Tg values greater than 120° C., notched Izod impact strength values greater than 150 J/m, and do not squeak or have screw recovery issues during injection molding at a barrel set point of 249° C.

In certain embodiments of the invention, the cellulose ester compositions contain 2.5 wt %-30 wt % EVA copolymer or mixtures of EVA copolymers, based on the total weight of the cellulose ester composition, have Tg values greater than 100° C., notched Izod impact strength values greater than 200 J/m, and viscosities at 230° C. and 100 rad/sec less than 10,000 P.

In certain embodiments of the invention, the cellulose ester compositions contain 2.5 wt %-30 wt % EVA copolymer or mixtures of EVA copolymers, based on the total weight of the cellulose ester composition, have Tg values greater than 120° C., notched Izod impact strength values greater than 200 J/m, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments, the cellulose ester composition contains a CAP resin, 5 to 20 wt % EVA copolymer or mixtures of EVA copolymers, and 5 to 15 wt % plasticizer, based on the total weight of the cellulose ester composition, and has a Tg value greater than 80° C., notched Izod impact strength values greater than 500, or greater than 600 J/m, viscosities at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments, the cellulose ester composition contains a CAP resin, 5 to 20 wt % EVA copolymer or mixtures of EVA copolymers, and 5 to 15 wt % plasticizer, based on the total weight of the cellulose ester composition, and has a Tg value greater than 120° C., notched Izod impact strength value greater than 350, or greater than 400 J/m, viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments, the cellulose ester composition contains a CAP resin, 5 to 10 wt % EVA copolymer or mixtures of EVA copolymers (having a VA content or weight average VA content from 45 to 65, or 50 to 65 percent), based on the total weight of the cellulose ester composition, and has a Tg value greater than 140° C., notched Izod impact strength value greater than 200 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments, the cellulose ester composition contains a CAP resin, 10 to 25 wt % EVA copolymer or mixtures of EVA copolymers (having a VA content or weight average VA content from 50 to 65 percent), based on the total weight of the cellulose ester composition, and has a Tg value greater than 140° C., notched Izod impact strength values greater than 250, or greater than 300, or greater than 400 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments, the cellulose ester composition contains a CAB resin, 5 to 15 wt % EVA copolymer or mixtures of EVA copolymers (having a VA content or weight average VA content from 45 to 65, or 50 to 65 percent), based on the total weight of the cellulose ester composition, and has a Tg value greater than 130° C., notched Izod impact strength values greater than 250 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments of the invention, 3.2 mm thick plaques of the cellulose ester compositions contain 2.5 wt %-30 wt % EVA copolymer or mixtures of EVA copolymers, (having a VA content or weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C.

In certain embodiments of the invention, 3.2 mm thick plaques of the cellulose ester compositions contain 2.5 wt %-30 wt % EVA copolymer or mixtures of EVA copolymers, (having a VA content or weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C., notched Izod impact strength values greater than 100, or 125, or 150 J/m, and viscosities at 230° C. and 100 rad/sec less than 10,000 P.

In certain embodiments of the invention, 3.2 mm thick plaques of the cellulose ester compositions contain 2.5 wt %-30 wt % EVA copolymer or mixtures of EVA copolymers, (having a VA content or weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120 C., notched Izod impact strength values greater than 250 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments of the invention, 3.2 mm thick plaques of the CAP compositions contain 2.5 wt %-30 wt % EVA copolymer or mixtures of EVA copolymers, (having a VA content or weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C.

In certain embodiments of the invention, 3.2 mm thick plaques of the CAP compositions contain 2.5 wt %-30 wt % EVA copolymer or mixtures of EVA copolymers, (having a VA content or weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C., notched Izod impact strength values greater than 100, or 125, or 150 J/m, and viscosities at 230° C. and 100 rad/sec less than 10,000 P.

In certain embodiments of the invention, 3.2 mm thick plaques of the CAP compositions contain 2.5 wt %-30 wt % EVA copolymer or mixtures of EVA copolymers, (having a VA content or weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C., notched Izod impact strength values greater than 250 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments of the invention, 3.2 mm thick plaques of the cellulose ester compositions contain a combined total of 2.5 wt %-30 wt % of two or more EVA copolymers (having a weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C.

In certain embodiments of the invention, 3.2 mm thick plaques of the cellulose ester compositions contain a combined total of 2.5 wt %-30 wt % of two or more EVA copolymers (having a weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C., notched Izod impact strength values greater than 100, or 125, or 150 J/m, and viscosities at 230° C. and 100 rad/sec less than 10,000 P.

In certain embodiments of the invention, 3.2 mm thick plaques of the cellulose ester contain a combined total of 2.5 wt %-30 wt % of two or more EVA copolymers (having a weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120 C., notched Izod impact strength values greater than 250 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In certain embodiments of the invention, 3.2 mm thick plaques of the CAP compositions contain a combined total of 2.5 wt %-30 wt % of two or more EVA copolymers (having a weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C.

In certain embodiments of the invention, 3.2 mm thick plaques of the CAP contain a combined total of 2.5 wt %-30 wt % of two or more EVA copolymers (having a weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C., notched Izod impact strength values greater than 100, or 125, or 150 J/m, and viscosities at 230° C. and 100 rad/sec less than 10,000 P.

In certain embodiments of the invention, 3.2 mm thick plaques of the CAP contain a combined total of 2.5 wt %-30 wt % of two or more EVA copolymers (having a weight average VA content from 50 to 65, or greater than 50 up to 65 percent), based on the total weight of the cellulose ester composition, the polymer-based resin exhibit ductile failure as defined in section X1.8 of ASTM D3763 when tested by instrumented impact according to ASTM D3763, and have Tg values greater than 120° C., notched Izod impact strength values greater than 250 J/m, a viscosity at 230° C. and 100 rad/sec less than 10,000 P, and a light transmission value greater than 80%, or at least 85%, or at least 90%, measured according to ASTM D1003 using a 3.2 mm plaque after injection molding at a barrel set point of 249° C. and a residence time of 5 min.

In another embodiment of the invention, the cellulose ester compositions further comprise at least one additive selected from the group comprising antioxidants, thermal stabilizers, mold release agents, antistatic agents, whitening agents, colorants, flow aids, processing aids, plasticizers, anti-fog additives, minerals, UV stabilizers, lubricants, chain extenders, nucleating agents, reinforcing fillers, wood or flour fillers, glass fiber, carbon fiber, flame retardants, dyes, pigments, colorants, additional resins and combinations thereof.

In certain embodiments, in addition to the EVA (discussed herein), the cellulose ester composition includes stabilizers selected from the group consisting of secondary antioxidants, acid scavengers, or a combination thereof. In certain embodiments, in addition to the EVA (discussed herein), the cellulose ester composition includes a secondary antioxidant in the range from about 0.1 to about 0.8 wt % based on the total weight of the composition. In certain embodiments, in addition to the EVA (discussed herein), the cellulose ester composition includes an acid scavenger in the range from about 0.2 to about 2.0 wt % based on the total weight of the composition. In one embodiment, in addition to the EVA (discussed herein), the cellulose ester composition includes a secondary antioxidant in the range from about 0.1 to about 0.8 wt % and an acid scavenger in the range from about 0.2 to about 2.0 wt % based on the total weight of the composition. In one embodiment, the secondary antioxidant is 3,9-bis(2,4-di-tert-butylphenoxy)-2,4,8,10-tetraoxa-3,9-diphosphaspiro[5.5]undecane. In one embodiment, the acid scavenger is an epoxidized fatty acid ester. In one embodiment, the cellulose ester composition further includes a salt stabilizer, for example in the range from about 0.1 to about 0.5 wt % based on the total weight of the composition. In one embodiment, other than the cellulose ester, EVA and stabilizers (discussed herein), the cellulose ester composition contains a total of less than 5 wt %, or less than 2 wt %, of any other components, based on the total weight of the composition.

In certain embodiments, the cellulose ester composition contains no maleic anhydride modified EVA. In certain embodiments, the cellulose ester composition contains no polyether ester compounds. In certain embodiments, the cellulose ester composition contains no adipic acid compounds. In certain embodiments, the cellulose ester composition comprises 65-99 wt % of one or more cellulose esters, 1-35 wt % of one or more EVA copolymers, and less than 5 wt % total of other components, based on the total weight of the cellulose ester composition. In certain embodiments, such other components do not include plasticizers, polyether ester compounds or adipic acid compounds. In certain embodiments, the cellulose ester composition contains dioctyl adipate (DOA) plasticizer and no other adipic acid compounds.

In another embodiment of the invention, a process for producing a cellulose ester composition is provided. The process comprises contacting at least one cellulose ester, at least one EVA copolymer, and optionally at least one plasticizer. The cellulose ester, plasticizer, and EVA copolymers were previously discussed in this disclosure. In one embodiment, the cellulose ester, EVA copolymers, and optional plasticizers can be mixed in any order of addition.

In another embodiment of this invention, a process for producing a cellulose ester composition is provided comprising: a) mixing at least one EVA copolymer, at least one cellulose ester, and optionally at least one plasticizer for a sufficient time and temperature to disperse the EVA copolymer to produce the cellulose ester composition. A sufficient temperature is defined as the flow temperature of the cellulose ester which is generally about 50° C. above the Tg of the cellulose ester. In another embodiment, the temperature is about 80° C. above the Tg of the cellulose ester. In embodiments, the temperature at mixing is limited at the upper range by the processing temperature of the EVA copolymer and at the lower range by the highest use temperature of the cellulose ester composition.

The efficiency of mixing two or more viscoelastic materials can depend on the ratio of the viscosities of the viscoelastic materials. In an embodiment, for a given mixing equipment and shear rate range, the viscosity ratio of the dispersed phase (EVA copolymer) and continuous phase (cellulose ester) should be within specified limits for obtaining adequate particle size.

In embodiments, mixing of the EVA copolymers, cellulose esters, and the optional plasticizers and any additives can be accomplished by any method known in the art that is adequate to disperse the EVA copolymers, plasticizers and additives into the cellulose esters. Examples of mixing equipment include, but are not limited to, Banbury mixers, Brabender mixers, roll mills, and extruders (single or twin screw). The shear energy during the mixing is dependent on the combination of equipment, blade design, rotation speed (rpm), and mixing time. The shear energy should be sufficient to disperse the EVA copolymer throughout the cellulose ester.

In embodiments, the cellulose ester, EVA copolymer, plasticizer and additives can be combined in any order during the process. In one embodiment, the cellulose ester is premixed with the EVA copolymer and/or the plasticizer. The cellulose ester containing the EVA copolymer and/or the plasticizer is then mixed with the additives. In another embodiment of the invention, when reactive impact modifiers are utilized, the reactive impact modifiers can be mixed with the cellulose esters first, and then the other components are added.

The compositions of this invention are useful as molded plastic parts or as solid plastic objects. The compositions are suitable for use in any applications where hard clear plastics are required. Examples of such parts include disposable knives, forks, spoons, plates, cups, straws as well as eyeglass frames, toothbrush handles, toys, automotive trim, tool handles, camera parts, parts of electronic devices, razor parts, ink pen barrels, disposable syringes, bottles, and the like. In one embodiment, the compositions of the present invention are useful as plastics, films, fibers (including melt spinning fibers and solvent spinning fibers), and sheets. In one embodiment, the compositions are useful as plastics to make bottles, bottle caps, eyeglass frames, cutlery, disposable cutlery, cutlery handles, shelving, shelving dividers, electronics housing, electronic equipment cases, computer monitors, printers, keyboards, pipes, automotive parts, automotive interior parts, automotive trim, signs, thermoformed letters, siding, toys, thermally conductive plastics, ophthalmic lenses, tools, tool handles, utensils. In another embodiment, the compositions of the present invention are suitable for use as films, sheeting, fibers, molded articles, medical devices, packaging, bottles, bottle caps, eyeglass frames, cutlery, disposable cutlery, cutlery handles, shelving, shelving dividers, furniture components, electronics housing, electronic equipment cases, computer monitors, printers, keyboards, pipes, toothbrush handles, automotive parts, automotive interior parts, automotive trim, signs, outdoor signs, skylights, multiwall film, thermoformed letters, siding, toys, toy parts, thermally conductive plastics, ophthalmic lenses and frames, tools, tool handles, and utensils, healthcare supplies, commercial foodservice products, boxes, film for graphic arts applications, and plastic film for plastic glass laminates.

The present cellulose ester compositions are useful in forming fibers, films, molded articles, and sheeting. The methods of forming the cellulose ester compositions into fibers, films, molded articles, and sheeting can be according to methods known in the art. Examples of potential molded articles include without limitation: medical devices, medical packaging, healthcare supplies, commercial foodservice products such as food pans, tumblers and storage boxes, bottles, food processors, blender and mixer bowls, utensils, water bottles, crisper trays, washing machine fronts, vacuum cleaner parts and toys. Other potential molded articles could include ophthalmic lenses and frames.

The invention further relates to articles of manufacture comprising the film(s) and/or sheet(s) containing cellulose ester compositions described herein. In embodiments, the films and/or sheets of the present invention can be of any thickness which would be apparent to one of ordinary skill in the art.

The invention further relates to the film(s) and/or sheet(s) described herein. The methods of forming the cellulose ester compositions into film(s) and/or sheet(s) can include known methods in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, wet block processing, dry block processing and solution casting.

The invention further relates to the molded articles described herein. The methods of forming the cellulose ester compositions into molded articles can include known methods in the art. Examples of molded articles of the invention including but not limited to injection molded articles, extrusion molded articles, injection blow molded articles, injection stretch blow molded articles and extrusion blow molded articles. Methods of making molded articles include but are not limited to injection molding, extrusion, injection blow molding, injection stretch blow molding, and extrusion blow molding. The processes of the invention can include any blow molding processes known in the art including, but not limited to, extrusion blow molding, extrusion stretch blow molding, injection blow molding, and injection stretch blow molding.

This invention includes any injection blow molding manufacturing process known in the art. Although not limited thereto, a typical description of injection blow molding (IBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) blowing air into the preform, causing the preform to stretch and expand to fill the mold; 5) cooling the molded article; 6) ejecting the article from the mold.

This invention includes any injection stretch blow molding manufacturing process known in the art. Although not limited thereto, a typical description of injection stretch blow molding (ISBM) manufacturing process involves: 1) melting the composition in a reciprocating screw extruder; 2) injecting the molten composition into an injection mold to form a partially cooled tube closed at one end (i.e. a preform); 3) moving the preform into a blow mold having the desired finished shape around the preform and closing the blow mold around the preform; 4) stretching the preform using an interior stretch rod, and blowing air into the preform causing the preform to stretch and expand to fill the mold; 5) cooling the molded article; 6) ejecting the article from the mold.

This invention includes any extrusion blow molding manufacturing process known in the art. Although not limited thereto, a typical description of extrusion blow molding manufacturing process involves: 1) melting the composition in an extruder; 2) extruding the molten composition through a die to form a tube of molten polymer (i.e. a parison); 3) clamping a mold having the desired finished shape around the parison; 4) blowing air into the parison, causing the extrudate to stretch and expand to fill the mold; 5) cooling the molded article; 6) ejecting the article of the mold; and 7) removing excess plastic (commonly referred to as flash) from the article.

This invention can be further illustrated by the following examples of preferred embodiments thereof, although it will be understood that these examples are included merely for purposes of illustration and are not intended to limit the scope of the invention unless otherwise specifically indicated.

EXAMPLES

Cellulose ester compositions were prepared by compounding selected cellulose esters with EVA copolymers and/or plasticizers. Unless otherwise specified, the compounding of the cellulose ester compositions was conducted on a Leistritz 18 mm (50:1 L/D ratio) twin screw extruder at a throughput of 18 lbs/hour with screw speed of 250 rpm and barrel temperature of 220° C. The barrel temperatures were 230° C. for compounding CA and CAP141-20 based compositions. The cellulose ester grades used in the following examples are identified above in Table 1.

The EVA copolymers used in the examples are identified below in Table 2.

TABLE 2

| EVA Grade | Commercial EVA Material | VA content (mol %) |
|---|---|---|
| A | Levamelt 800 | 80 |
| B | Levamelt 700 | 70 |
| C | Levamelt 600 | 60 |
| D | Levamelt 500 | 50 |
| E | Levamelt 456 | 45 |
| F | Elvax 40w | 40 |
| G | Evatane 28-40 | 28 |
| H | Evatane 18-150 | 18 |

Levamelt 456, Levamelt 500, Levamelt 600, Levamelt 700, and Levamelt 800 were obtained from Lanxess. Evatane 28-40, Evatane 18-150 were obtained from Arkema. Elvax 40W was obtained from Dupont. VA content values were obtained from the respective manufacturer's brochures.

The examples include testing on injection molded plaques and bars. Unless otherwise specified, the moldings were done on a Toyo injection molding machine with barrel temperature of 240° C. (460° F.) and mold temperature of 70° C. (160° F.). Unless otherwise specified, Tg, Haze, Light Transmission, Clarity, Melt Viscosity, and Notched Izod Impact Strength were measured/determined as discussed below.

Glass transition temperature (Tg) was measured according to ASTM Standard Method D3418, where the sample is heated from −100° C. at a heating rate of 20° C./min. DSC scans of blends of materials may show multiple Tg transitions. If more than one Tg transition was determined during the scan, the matrix glass transition is defined as the highest Tg measured during the scan.

Percent Haze and Light Transmission were measured on 102 mm×102 mm×3.2 mm injection molded plaques according to ASTM D1003. In the examples, where a clarity grading was provided, the grading was determined by visual inspection, where a grading of clear corresponds to a % haze of less than about 10%, a grading of slight haze corresponds to a % haze greater than about 10%, or greater than about 15%, and less than about 25%, and a grading of haze or hazy corresponds to a % haze greater than about 25%.

Melt Viscosity was measured using a Rheometrics Dynamic Analyzer (RDA II) plate-plate melt rheometer with 25 mm diameter parallel plates, 1 mm gap and 10% strain measured in accordance with ASTM D4440 using frequency scan of between 1 rad/sec and 100 rad/sec.

Notched Izod Impact Strength was performed on 3.2 mm thick molded bars at 23° C. after notching according to ASTM Method D256, after conditioning the bars at 23° C. and 50% RH for 48 hours.

Example 1—CAP with and without Plasticizer

CAP grade 1 from Table 1 without any plasticizer (Ex. 1A) and with 10% DOA plasticizer (Ex. 1B) were each injection molded into 3.2 mm thick by 12.8 mm wide bars on a Toyo 110 Ton injection molding machine with barrel temperature of 240° C. and mold temperature of 70° C.

The clarity, melt viscosity, Tg and Izod Impact strength were determined for each sample. The compositions and properties of the materials for Examples 1A and 1 B are listed in Table 3 below.

TABLE 3

CAP material with and without plasticizer.

| EX. 1 | CE Grade | Plasticizer Grade | Plasticizer wt % | clarity | Melt viscosity (Pa · S) | Tg (° C.) | Impact Strength @23° C., J/m |
|---|---|---|---|---|---|---|---|
| A | 1 | | 0 | Clear | 10665 | 147 | 70.9 |
| B | 1 | DOA | 10 | Clear | | 108 | 312 |

Table 3 shows properties of CAP 482-20 blended with and without plasticizer. A review of the table reveals that the two plastics remained clear. The CAP plastic without plasticizer had relatively high glass transition temperature but a lower level of impact resistance. On the contrary, the plasticized CAP compound had a higher level of impact strength, but lower Tg. It would be desired to have a cellulose ester composition that has both the advantage of high Tg and good impact resistance.

Example 2—CE and EVA Blends

Different cellulose ester grades (from Table 1) were blended with different grades and different amounts of EVA copolymers and were injection molded into 3.2 mm thick by 12.8 mm wide bars on a Toyo 110 Ton injection molding machine with barrel temperature of 240° C. and mold temperature of 70° C.

The clarity, melt viscosity, Tg and Izod Impact strength were determined for each sample. The compositions and properties of the materials for Example 2 are listed in Table 4 below.

TABLE 4

CE and EVA copolymer blends

| EX. 2 | CE Grade | EVA Grade | EVA wt % | clarity | Tg (° C.) | Melt viscosity (Pa · S) | Impact Strength @23° C., J/m |
|---|---|---|---|---|---|---|---|
| A | 1 | Levamelt 800 | 10 | Clear | 118 | 8178 | 70.9 |
| B | 1 | Levamelt 700 | 10 | Clear | 140.6 | 9370 | 202 |
| C | 1 | Levamelt 600 | 5 | Clear | 142 | 10073 | 163 |
| D | 1 | Levamelt 600 | 10 | Clear | 143 | 9227 | 286 |
| E | 1 | Levamelt 600 | 15 | Clear | 141.7 | 9006 | 318 |
| F | 1 | Levamelt 600 | 25 | Slight haze | 141.4 | 7824 | 540.3 |
| G | 1 | Levamelt 500 | 10 | Clear | 141.8 | 9949 | 234 |
| H | 1 | Elvax 40w | 10 | Clear | 142 | 8594 | 201.7 |
| I | 1 | Evatane 28-40 | 10 | Haze | 141.7 | 9131 | 108.2 |
| J | 1 | Evatane 18-150 | 10 | Haze | 141 | 8922 | 115.16 |
| K | 2 | Levamelt 600 | 10 | Clear | 132 | 5795 | 158 |
| L | 3 | Levamelt 600 | 10 | Clear | 135 | 7194 | 265 |
| M | 3 | Levamelt 500 | 10 | Clear | 134 | 6795 | 262 |
| N | 3 | Elvax 40w | 10 | Clear | 133 | 6795 | 160 |
| O | 3 | Evatane 18-150 | 5 | Haze | 133 | 7276 | 107 |
| P | 4 | Levamelt 600 | 10 | Phase separation | 173.8 | 27238 | 149 |
| Q | 8 | Levamelt 600 | 10 | Phase separation | | | |

A review of Table 4 reveals that the CE/EVA compounds had significantly higher Tg in comparison with the plasticized CAP compound from Table 3. It further shows that for CAP 482-20 (Grade 1), when the VA content (of the EVA copolymer) was within a range from about 40% to 70%, or 50 to 65 wt %, it resulted in formulations that had both good clarity and increased toughness (i.e., Impact Strength greater than 150 J/m). It is believed that this was a result of adequate interfacial adhesion, close match of refractive index and fine dispersion of the EVA rubber particles. It is further believed that if the VA content is too high (e.g., 80%), the EVA and cellulose ester are completely miscible (single composition-dependent glass transition temperature). As a result, although such a formulation may be clear, the blend had a lower Tg and mediocre toughness.

A review of Table 4 also reveals that if the VA content (of the EVA copolymer) was too low (i.e., <40%), it resulted in a formulation that was hazy and generally more brittle. It is believed that such a formulation was hazy because of the lack of adequate interphase adhesion between EVA rubber particles and cellulose ester.

Example 3—High and Low MW CAP and EVA Blends

Different ratios of molecular weight (MW) CAP grades (from Table 1), one grade having a relative viscosity of 7.4 and one grade having a relative viscosity of 2.5, were blended with different amounts of the Levamelt 600 EVA copolymer and were injection molded into 3.2 mm thick by 12.8 mm wide bars on a Toyo 110 Ton injection molding machine with barrel temperature of 240° C. and mold temperature of 70° C.

The clarity, melt viscosity, Tg and Izod Impact strength were determined for each sample. The compositions and properties of the materials for Example 3 are listed in Table 5 below.

TABLE 5

Blends of high/low MW CAP with EVA

| Ex. 3 | CAP Grade 1 | CAP Grade 10 | EVA content | clarity | Tg (° C.) | Melt viscosity (Pa · S) | Impact strength @23° C., J/m |
|---|---|---|---|---|---|---|---|
| A | 50% | 50% | 5% | Clear | 144.3 | 6237 | 108 |
| B | 50% | 50% | 10% | Clear | 143.7 | 5790 | 118 |
| C | 50% | 50% | 15% | Clear | 142.2 | 5597 | 147.6 |

TABLE 5-continued

Blends of high/low MW CAP with EVA

| Ex. 3 | CAP Grade 1 | CAP Grade 10 | EVA content | clarity | Tg (°C.) | Melt viscosity (Pa · S) | Impact strength @23° C., J/m |
|---|---|---|---|---|---|---|---|
| D | 75% | 25% | 5% | Clear | 143.1 | 8134 | 156.5 |
| E | 75% | 25% | 10% | Clear | 143.2 | 7553 | 195.4 |
| F | 75% | 25% | 15% | Clear | 142 | 7112 | 212.4 |

A review of Table 5 reveals that blending lower molecular weight cellulose esters into the formulation provided better flow (or lower melt viscosity). It is believed that blending in lower MW cellulose esters may also provide improved color stability, due to lower processing temperature. It also shows that the blends of CAP 482-20 with CAP 482-0.5 and the EVA had slightly lower toughness than equivalent CAP 482-20/EVA compositions at similar EVA loading. The tensile and flex properties (not shown) of CAP 482-20 containing up to 50% 482-0.5 were essentially unchanged compared to similar compositions with just CAP 482-20.

Example 4—Intermediate MW CAP and EVA Blends

An intermediate molecular weight (MW) CAP grade (from Table 1), having a relative viscosity of 4.26, was blended with 10 wt % of different grades of EVA copolymer and were injection molded into 3.2 mm thick by 12.8 mm wide bars on a Toyo 110 Ton injection molding machine with barrel temperature of 240° C. and mold temperature of 70° C.

The clarity, melt viscosity, Tg and Izod Impact strength were determined for each sample. The compositions and properties of the materials for Example 4 are listed in Table 6 below.

TABLE 6

Blends of intermediate MW CAP with EVA

| Ex. 4 | CAP Grade | EVA Grades | EVA content | clarity | Tg | Melt viscosity (Pa · S) | Impact strength @23° C., J/m |
|---|---|---|---|---|---|---|---|
| A | 6 | Levamelt 800 | 10% | Clear | 138.6 | 4389 | 64.5 |
| B | 6 | Levamelt 600 | 10% | Clear | 143.7 | 5790 | 118 |
| C | 6 | Levamelt 500 | 10% | Clear | 144.65 | 5792 | 88.6 |
| D | 6 | Elvax 40w | 10% | Clear | 143 | 5049 | 98.7 |
| E | 6 | Evatane 28-40 | 10% | Some hazy | 142.7 | 4968 | 95.5 |
| F | 6 | Levamelt 600 | 15% | Some hazy | 142.6 | 5597 | 147 |

A review of Table 6 reveals that an intermediate molecular weight cellulose ester could be used rather than a blend of high and low molecular weight cellulose ester. The Table shows that the intermediate molecular weight cellulose ester provided good compatibility with EVA, where lower VA content EVA (VA≈28-40%) could be used and still provide a toughness (as shown in 4E) that may be adequate for certain applications. However, where higher toughness is needed, a comparison of Examples 4B to 2D, and 4C to 2G, shows that using a CAP having a relative viscosity greater than 6.0 resulted in significantly higher Impact Strength and similar Tg values, compared to using a CAP with lower relative viscosity at identical EVA loading. Thus, in certain embodiments of the invention, cellulose ester compositions with relative viscosity values greater than 6.0 are preferred.

Example 5—CAP, EVA and Plasticizer Blends

Cellulose ester grade 1 (from Table 1) was blended with different grades of EVA copolymer and different types and amounts of plasticizers and were injection molded into 3.2 mm thick by 12.8 mm wide bars on a Toyo 110 Ton injection molding machine with barrel temperature of 240° C. and mold temperature of 70° C. DOA is dioctyl adipate and TEGEH is triethylene glycol bis-2-ethyl hexanoate.

The clarity, melt viscosity, Tg and Izod Impact strength were determined for each sample. The compositions and properties of the materials for Example 5 are listed in Table 7 below.

TABLE 7

Blends of CE, EVA and Plasticizers

| Ex. 5 | CAP Grades | EVA Grades | EVA content | Pz | PZ Content | clarity | Tg | Melt viscosity (Pa · S) | Impact strength @23° C., J/m |
|---|---|---|---|---|---|---|---|---|---|
| A | 1 | Levamelt 600 | 10% | DOA | 5% | Clear | 140 | 8126 | 245.6 |
| B | 1 | Levamelt 600 | 10% | TEGEH | 5% | Hazy | 128 | 5110 | 398 |
| C | 1 | Levamelt 800 | 10% | TEGEH | 14% | Clear | 82 | 1383 | 630 |

A review of Table 7 reveals that the addition of plasticizer can act as a flow aid for the cellulose ester composition. It further shows that the flow aid level should be kept lower than the typical plasticizer levels for cellulose esters, in order to provide compounds having higher Tg than fully plasticized cellulose ester compounds, as well as good toughness and good flow. In some cases, it was found that certain plasticizers end up in the EVA (dispersed or minor phase) rather than CE (continuous or major phase), such as in example 5A. As a result, the addition of plasticizer (DOA) did lower the viscosity without a significant negative impact on glass transition temperature, as compared to example 2D. It is believed this may provide better flow and improved color stability, due to lower processing temperature, for certain applications.

Example 6—CAP and EVA Copolymer Blends

Different cellulose ester grades (from Table 1) were blended with combinations of different grades of EVA copolymers and were injection molded into 3.2 mm thick by 12.8 mm wide bars on a Toyo 110 Ton injection molding machine with barrel temperature of 240° C. and mold temperature of 70° C.

The clarity, Tg and Izod Impact strength were determined for each sample. The compositions and properties of the materials for Example 6 are listed in Table 8 below.

TABLE 8

Blends of CE with Different EVA Copolymers

| Ex. 6 | CE Grade | EVA Grades | % EVA | Weight average VA content | clarity | Tg (° C.) | Impact Strength @23° C., J/m |
|---|---|---|---|---|---|---|---|
| A | 1 | Levamelt 600 + Elvax 40w | 5% + 5% | 50 | Clear | 142 | 125 |
| B | 6 | Levamelt 800 + Evatane 28-40 | 5% + 5% | 54 | Clear | 136 | 170 |
| C | 6 | Levamelt 500 + Levamelt 700 | 10% + 5% | 57 | Clear | 140 | 183 |
| D | 6 | Elvax 40w + Levamelt 700 | 10% + 5% | 50 | Clear | 140 | 177 |
| E | 6 | Levamelt 500 + Levamelt 700 | 10% + 5% | 57 | Clear | 141 | 140 |
| F | 1 | Elvax 40w + Levamelt 700 | 10% + 5% | 50 | Clear | 142 | 347 |
| G | 1 | Levamelt 500 + Levamelt 700 | 7.5% + 7.5% | 60 | Clear | 142 | 353 |
| H | 1 | Levamelt 500 + Levamelt 700 | 10% + 5% | 57 | Clear | 141 | 371 |
| I | 1 | Levamelt 500 + Levamelt 700 | 10% + 2.5% | 54 | Clear | 142 | 336 |
| J | 1 | Levamelt 500 + Levamelt 700 | 15% + 7.5% | 57 | Clear | 139 | 522 |
| K | 1 | Levamelt 500 + Levamelt 700 | 15% + 3.75% | 54 | Clear | 140 | 459 |

A review of Table 8 reveals that blending different EVA copolymers having higher and lower VA content with a CAP resulted in a higher impact strength (example 6B) compared to similar amounts of just the higher VA (example 4A) or just the lower VA (example 4E) content EVA copolymers, as well as having good clarity.

Selected materials from Tables 4 and 8 were also injection molded into plaques 3.2 mm thick by 102 mm by 102 mm wide on a Toyo 110 Ton injection molding machine with barrel temperature of 240° C. and mold temperature of 70° C. for instrumented impact testing per ASTM D 3763. Table 9 shows the failure mode for each sample. Ductile failure mode is given where the specimen deformed plastically before fracturing without cracks radiating more than 10 mm beyond the center of the impact point. Brittle failure mode is given where the specimen test area is broken into two or more pieces, with sharp edges and shows almost no plastic flow. Surprisingly, the compositions using mixtures of EVA copolymers show ductile failure while the compositions using a single EVA copolymer are ductile, even at comparable % EVA and average VA % content.

TABLE 9

Failure Mode Analysis

| Example | EVA Grades | % EVA | Average VA % content | Instrument Impact failure mode |
|---|---|---|---|---|
| Ex 2-D | Levamelt 600 | 10% | 60% | Brittle |
| Ex 2-E | Levamelt 600 | 15% | 60% | Brittle |
| Ex 6-A | Levamelt 500 + Levamelt 700 | 7.5% + 7.5% | 60% | Ductile |
| Ex 6-B | Levamelt 500 + Levamelt 700 | 10% + 5% | 56.7% | Ductile |
| Ex 6-C | Levamelt 500 + Levamelt 700 | 10% + 2.5% | 54% | Brittle |

TABLE 9-continued

Failure Mode Analysis

| Example | EVA Grades | % EVA | Average VA % content | Instrument Impact failure mode |
|---|---|---|---|---|
| Ex 6-D | Levamelt 500 + Levamelt 700 | 15% + 7.5% | 56.7% | Ductile |
| Ex 6-E | Levamelt 500 + Levamelt 700 | 15% + 3.75% | 54% | Ductile |
| Ex 6-F | Elvax40w + Levamelt 700 | 10% + 5% | 50% | Brittle |

Example 7—Percent Haze and Light Transmission for CAP Compositions

The percent haze and light transmission was determined for CAP compositions without impact modifier (IM) or EVA copolymer, with impact modifier, and with different levels of EVA copolymer after injection molding at 240° C. with a residence time of 5 min. All samples also included 0.5 wt % Irganox 1010. The compositions and properties of the materials for Example 7 are listed in Table 9 below.

TABLE 10

CAP compositions with IM or EVA Copolymer

| Ex. 7 | CE Grade | EVA/IM Grade | % IM or EVA | % Haze | % Transmission |
|---|---|---|---|---|---|
| A | 1 | None | 0% | 2.0 | 91.5 |
| B | 1 | ECO100* | 6% | 7.5 | 82.6 |
| C | 1 | Levamelt 600 | 10% | 4.8 | 91.5 |
| D | 1 | Levamelt 600 | 15% | 5.0 | 91.2 |

*ECO100 is an acrylic resin obtained from Kaneka.

A review of Table 10 reveals that adding an acrylic impact modifier or EVA copolymer (in the amounts specified) increased the haze for the CAP composition, compared to the CAP without IM or EVA, and the CAP compositions with the EVA copolymer resulted in less increase in haze than the CAP composition with the acrylic impact modifier. Also, the EVA copolymer had less effect on the % transmission than the impact modifier.

The above detailed description of embodiments of the disclosure is intended to describe various aspects of the invention in sufficient detail to enable those skilled in the art to practice the invention. Other embodiments can be utilized and changes can be made without departing from the scope of the invention. The above detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

That which is claimed is:

1. A cellulose ester composition comprising at least one cellulose ester, at least one ethylene vinyl acetate (EVA) copolymer, and optionally at least one plasticizer,
    wherein said at least one cellulose ester is chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB);
    wherein the relative viscosity of the at least one cellulose ester is greater than 6.0, for an acetone solution containing 2 wt % of the cellulose ester, measured at 25° C.; and
    wherein said cellulose ester composition has a Tg of at least 120° C.

2. The cellulose ester composition of claim 1, wherein said composition comprises 65-99 wt % of said cellulose ester, 1-35 wt % of said EVA, and 0-15 wt % of said plasticizer.

3. The cellulose ester composition of claim 1, wherein said composition comprises 65-99 wt % of said cellulose ester, 1-35 wt % of said EVA, and 0-5 wt % of said plasticizer.

4. The cellulose ester composition of claim 1, wherein said composition comprises 70-97.5 wt % of said cellulose ester, 2.5-30 wt % of said EVA, and contains no plasticizer.

5. The cellulose ester composition of claim 1, wherein said cellulose ester is chosen from cellulose acetate propionate (CAP) or cellulose acetate butyrate (CAB).

6. The cellulose ester composition of claim 1, wherein said cellulose ester composition comprises at least two different cellulose esters chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB),
    wherein at least one of cellulose esters has a relative viscosity greater than 6.0, for an acetone solution containing 2 wt % of the cellulose ester, measured at 25° C.; and wherein said cellulose ester composition has a Tg of at least 120° C.

7. The cellulose ester composition of claim 1, wherein said EVA has a vinyl acetate content in the range from 40 to 70 wt %.

8. The cellulose ester composition of claim 7, wherein said EVA has a vinyl acetate content in the range from 50 to 65 wt %.

9. The cellulose ester composition of any of claim 1, wherein said EVA is combination of at least two EVA copolymers having different vinyl acetate (VA) content, wherein the average VA content of the combination is in the range from 50 to 65 wt %, and wherein the composition exhibits ductile failure (when tested in accordance with the examples).

10. A cellulose ester composition comprising:
   i) at least one cellulose ester chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB);
   ii) at least one ethylene vinyl acetate (EVA) copolymer, and
   iii) at least one plasticizer;
   wherein said cellulose ester composition has a Tg of at least 120° C. and a notched Izod impact strength of at least 200 J/m, measured according to ASTM Method D256 at 23° C. using a 3.2 mm bar, after conditioning the bar at 23° C. and 50% RH for 48 hours.

11. The cellulose ester composition according to claim 10, wherein said cellulose ester composition has a cellulose ester continuous phase and an EVA copolymer discontinuous phase, and wherein the plasticizer is contained in the EVA discontinuous phase.

12. The cellulose ester composition according to claim 10, wherein said cellulose ester composition has a Tg that is not more than 5% different than the Tg of a similar cellulose ester composition without the plasticizer.

13. The cellulose ester composition according to claim 10, wherein the cellulose ester is CAP, the plasticizer is dioctyl adipate (DOA), and said EVA has a vinyl acetate content in the range from 40 to 70 wt %.

14. The cellulose ester composition according to claim 10, wherein the cellulose ester is CAP, the plasticizer is dioctyl adipate (DOA), and said EVA has a vinyl acetate content in the range from 50 to 65 wt %.

15. The cellulose ester composition according to claim 1, wherein said composition further comprises at least one additive selected from the group consisting of antioxidants, thermal stabilizers, mold release agents, antistatic agents, whitening agents, colorants, plasticizers, minerals, UV stabilizers, lubricants, nucleating agents, reinforcing fillers, glass fiber, carbon fiber, flame retardants, dyes, pigments, colorants, additional resins and combinations thereof.

16. The cellulose ester composition according to claim 1, further comprises at least one polymeric component as a blend
   wherein said polymer is selected from the group consisting of nylons; polyesters; polyamides; polystyrenes; other cellulose esters, cellulose ethers; polystyrene copolymers; styrene acrylonitrile copolymers; polyolefins; polyurethanes; acrylonitrile butadiene styrene copolymers; poly(methylmethacrylate); acrylic copolymers; poly(ether-imides); polyphenylene oxides; polyvinylchlorides; polyphenylene sulfides; polyphenylene sulfide/sulfones; poly(ester-carbonates); polycarbonates; polysulfones; poly lactic acid; poly butylenesuccinate; polysulfone ethers; and poly(etherketones) of aromatic dihydroxy compounds; and combinations thereof.

17. A process for producing a cellulose ester composition comprising mixing:
   a) at least one cellulose ester chosen from cellulose propionate (CP), cellulose butyrate (CB), cellulose acetate propionate (CAP), cellulose acetate butyrate (CAB), cellulose propionate butyrate (CPB), cellulose tripropionate (CTP), or cellulose tributyrate (CTB), and
   b) at least one EVA for a sufficient time and temperature to disperse said EVA throughout said cellulose ester to produce said composition;
   wherein the relative viscosity of the at least one cellulose ester is greater than 6.0, for an acetone solution containing 2 wt % of the cellulose ester, measured at 25° C.

18. An article of manufacture comprising the cellulose ester composition of claim 1.

19. The article of manufacture according to claim 18, wherein the article is chosen from an injection molded article, extrusion molded article, injection blow molded article, injection stretch blow molded article, extrusion blow molded article comprising the cellulose ester compositions of claim 1.

20. A film or sheet comprising a cellulose ester composition according to claim 1.

* * * * *